United States Patent
Morita

(10) Patent No.: US 9,571,752 B2
(45) Date of Patent: Feb. 14, 2017

(54) DISPLAY CONTROL APPARATUS AND DISPLAY CONTROL METHOD

(71) Applicant: SONY CORPORATION, Tokyo (JP)

(72) Inventor: Takao Morita, Chiba (JP)

(73) Assignee: SONY CORPORATION, Tokyo (JP)

( * ) Notice: Subject to any disclaimer, the term of this patent is extended or adjusted under 35 U.S.C. 154(b) by 196 days.

(21) Appl. No.: 14/066,973

(22) Filed: Oct. 30, 2013

(65) Prior Publication Data

US 2014/0176776 A1    Jun. 26, 2014

(30) Foreign Application Priority Data

Dec. 20, 2012   (JP) ................................. 2012-278549

(51) Int. Cl.
  *H04N 5/262*  (2006.01)
  *H04N 5/232*  (2006.01)
  *H04N 5/265*  (2006.01)

(52) U.S. Cl.
  CPC ........ *H04N 5/2621* (2013.01); *H04N 5/23293* (2013.01); *G06T 2207/20212* (2013.01); *H04N 5/265* (2013.01); *H04N 5/2625* (2013.01)

(58) Field of Classification Search
  None
  See application file for complete search history.

(56) References Cited

U.S. PATENT DOCUMENTS

| 6,519,046 | B1 * | 2/2003 | Kinjo ................... G03D 15/001 |
|---|---|---|---|
| | | | 348/207.1 |
| 7,071,969 | B1 * | 7/2006 | Stimson, III ............. 348/207.11 |
| 7,221,398 | B2 * | 5/2007 | Stavely et al. ........... 348/333.05 |
| 9,183,221 | B2 * | 11/2015 | Dicklin ............. G06F 17/30241 |
| 2008/0186387 | A1 * | 8/2008 | Iwamoto et al. .......... 348/222.1 |
| 2008/0297622 | A1 * | 12/2008 | Miyashita .................. 348/229.1 |
| 2010/0091142 | A1 * | 4/2010 | Iijima ................... H04N 5/265 |
| | | | 348/239 |

FOREIGN PATENT DOCUMENTS

JP         2008042382 A  *  2/2008

\* cited by examiner

*Primary Examiner* — Roberto Velez
*Assistant Examiner* — Quan Pham
(74) *Attorney, Agent, or Firm* — Chip Law Group

(57) ABSTRACT

There is provided a display control apparatus including a predicted-image generation unit configured to generate a predicted image of an imaging result based on a shutter speed, and a display control unit configured to update display of the predicted image in an update cycle corresponding to the shutter speed.

16 Claims, 19 Drawing Sheets

FIG. 7
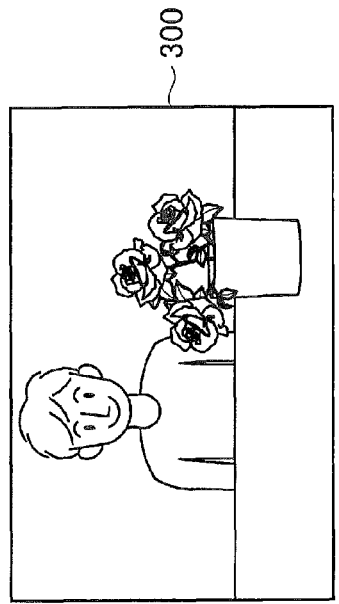
PREVIEW IMAGE
PERFORM BLUR PROCESSING ON AREA EXCEPT AREA AROUND FOCUS POINT
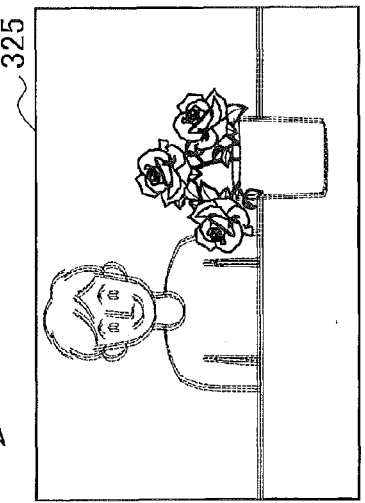
LOW APERTURE VALUE
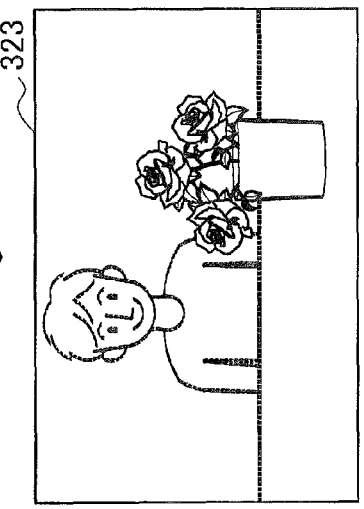
NORMAL APERTURE VALUE
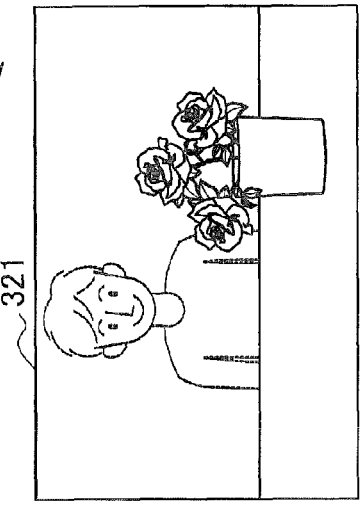
HIGH APERTURE VALUE FIG. 8
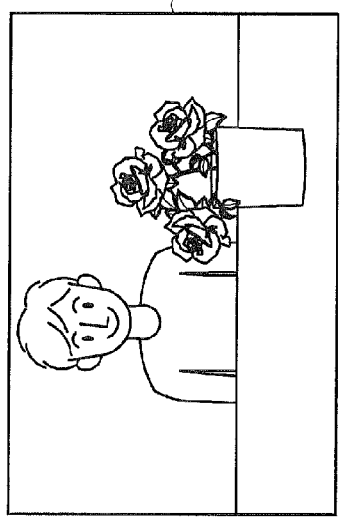
PREVIEW IMAGE
ROUGHEN IMAGE QUALITY BY IMAGE ROUGHENING FILTER PROCESSING
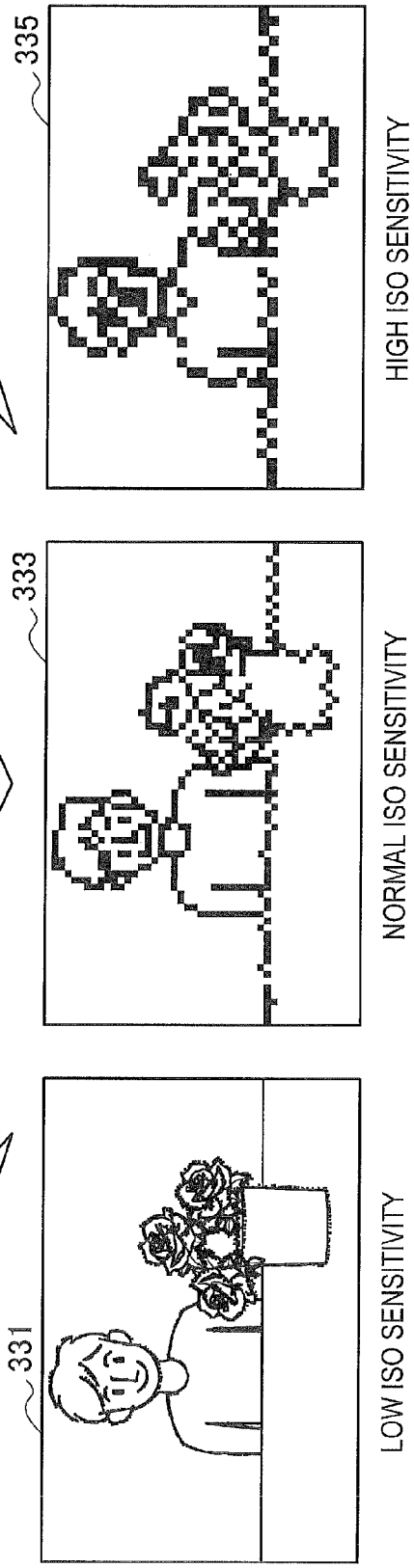

FIG. 18
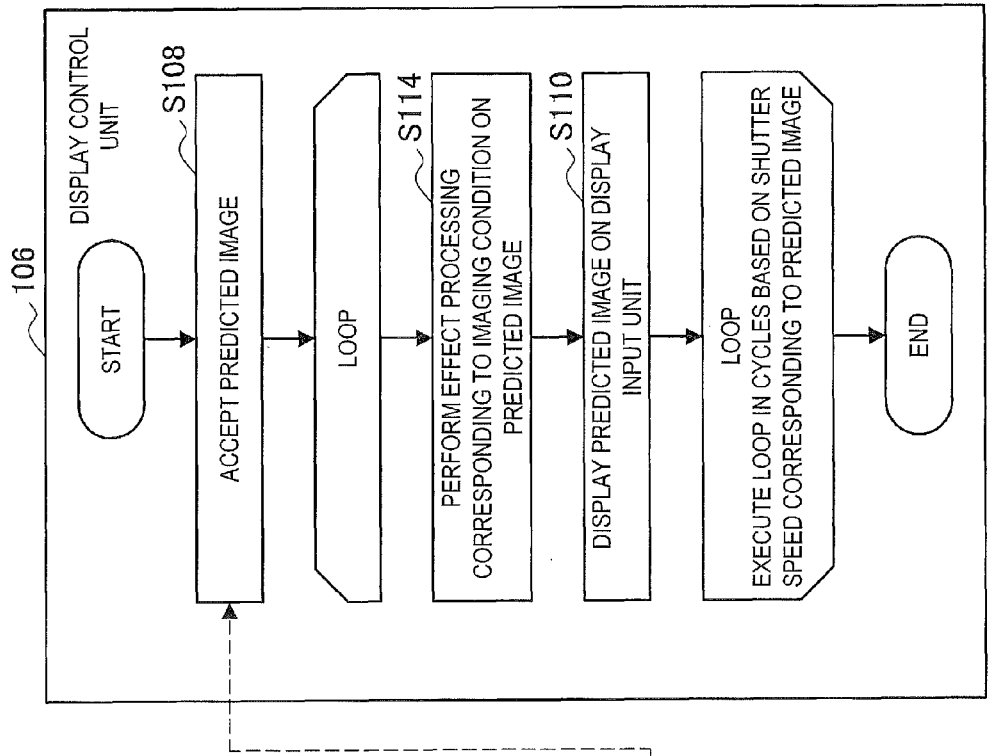
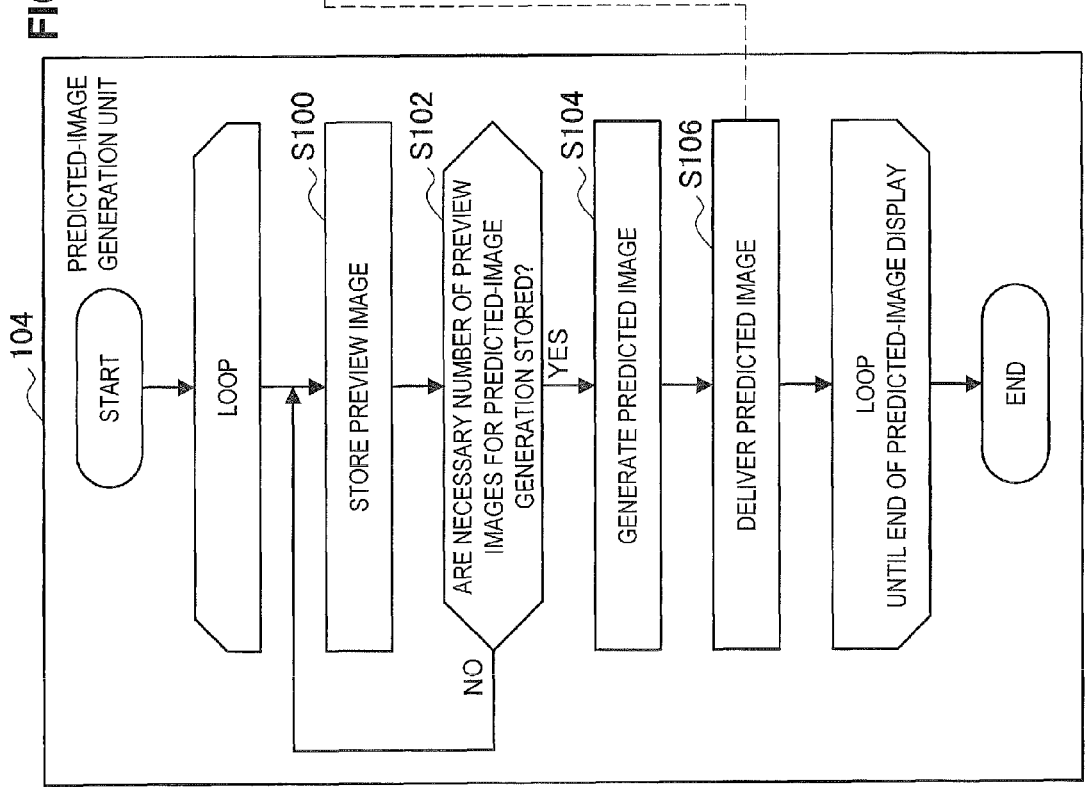

DISPLAY CONTROL APPARATUS AND DISPLAY CONTROL METHOD

CROSS REFERENCE TO RELATED APPLICATION(S)

This application claims the benefit of Japanese Priority Patent Application JP 2012-278549 filed Dec. 20, 2012, the entire contents of which are incorporated herein by reference.

BACKGROUND

The present disclosure relates to a display control apparatus and a display control method.

Imaging apparatuses have been used widely in recent years which are represented by digital cameras including imaging devices such as CMOS (Complementary Metal Oxide Semiconductor) image sensors and CCD (Charge Coupled Device) image sensors. Many of such imaging apparatuses are provided with a function of displaying an image called a preview image (also referred to as a through image or an EE image) to cause a user to check an image every time the image is captured.

The preview image is an image photoelectrically converted by imaging devices built in the imaging apparatus, being currently captured by the imaging apparatus. The preview image is, for example, outputted to a display panel built in the body of the imaging apparatus, or outputted to an external display apparatus connected to the imaging apparatus. By viewing the preview image, the user can check any time the composition of the image being captured by the image apparatus, an amount of camera shake, and the like.

However, even though the image is captured after the user checks the image captured in the preview image, an actual imaging result sometimes differs from the preview image depending on an imaging condition such as a shutter speed. To address such a case, for example, JP 2008-42382A discloses a technology by which a plurality of continuously acquired preview images are combined together to generate a predicted image and the predicted image is displayed in such a manner as to be superimposed on the preview image.

SUMMARY

However, with the technology disclosed in JP 2008-42382A above, it is difficult for the user to intuitively know what imaging condition is used to capture the predicted image superimposed on the preview image.

In light of foregoing, it is desirable to provide a display control apparatus and a display control method, which are novel and improved, and which can depict the predicted image in such a manner that the predicted image corresponds to the imaging condition.

According to an embodiment of the present disclosure, there is provided a display control apparatus including a predicted-image generation unit configured to generate a predicted image of an imaging result based on a shutter speed, and a display control unit configured to update display of the predicted image in an update cycle corresponding to the shutter speed.

According to an embodiment of the present disclosure, there is provided a display control apparatus including a predicted-image generation unit configured to generate a predicted image of an imaging result based on an imaging condition, and a display control unit configured to perform effect processing on the predicted image in accordance with the imaging condition.

According to an embodiment of the present disclosure, there is provided a display control method including generating a predicted image of an imaging result based on a shutter speed, and updating display of the predicted image in an update cycle corresponding to the shutter speed.

According to an embodiment of the present disclosure, there is provided a display control method including generating a predicted image of an imaging result based on an imaging condition, and performing effect processing on the predicted image in accordance with the imaging condition.

According to one or more of embodiments of the present disclosure, it is possible to depict the predicted image in such a manner that the predicted image corresponds to the imaging condition.

BRIEF DESCRIPTION OF THE DRAWINGS

FIG. 7 is an explanatory diagram illustrating a method for generating a predicted image based on an aperture value;

FIG. 8 is an explanatory diagram illustrating a method for generating a predicted image based on an ISO sensitivity;

FIG. 18 is a flowchart illustrating an operation in a third display control example.

DETAILED DESCRIPTION OF THE EMBODIMENTS

Figure 1:
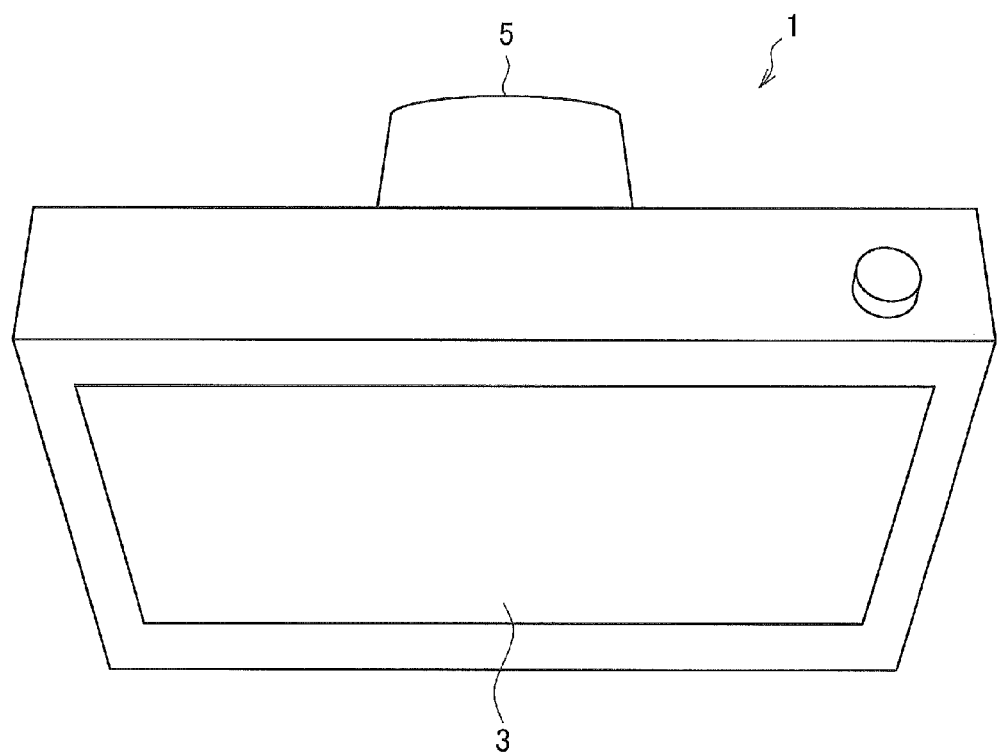
FIG. 1 is an outline diagram illustrating a specific example of a display control apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order:
1. Configuration of Display Control Apparatus
  1.1. Appearance Example of Display Control Apparatus
  1.2. Internal Configuration of Display Control Apparatus
2. Modes of Display Control by Display Control Apparatus
  2.1. First Display Control Example
    2.1.1. Operation in First Display Control Example
    2.1.2. Specific Example of Display in First Display Control Example
  2.2. Second Display Control Example
    2.2.1. Operation in Second Display Control Example
    2.2.2. Specific Examples of Display in Second Display Control Example
  2.3. Third Display Control Example
    2.3.1. Operation in Third Display Control Example
3. Hardware Configuration of Display Control Apparatus
<1. Configuration of Display Control Apparatus>
[1.1. Appearance Example of Display Control Apparatus]

Firstly, a schematic configuration of a display control apparatus according to an embodiment of the present disclosure will be described with reference to FIG. 1. FIG. 1 is an outline diagram illustrating a specific example of the display control apparatus according to the embodiment of the present disclosure.

As illustrated in FIG. 1, a display control apparatus 1 according to the embodiment of the present disclosure includes a display input unit 3 and an imaging unit 5. For example, the display control apparatus 1 is a digital camera or the like having a function of displaying images.

The imaging unit 5 includes an imaging lens, imaging devices, and the like. Each of the imaging devices is configured of a CMOS image sensor, a CCD image sensor, or the like. The imaging device receives light made incident from a subject through the imaging lens, and photoelectrically converts the light to an image signal. In other words, the imaging unit 5 captures an image of the subject and thereby can acquire the image of the subject. Here, a configuration of the imaging unit 5 is not limited to that as illustrated in FIG. 1 having the imaging devices and the imaging lens which are integrated into one unit. For example, the imaging unit 5 may be a lens-replaceable camera or the like which is attachably and detachably provided with an imaging lens.

The display input unit 3 is, for example, an LCD (Liquid Crystal Display) device or an OLED (Organic Light Emitting Diode) device, and has a touch panel function. As illustrated in FIG. 1, the display input unit 3 is provided on one surface of the display control apparatus 1 to spread in a wide range. In accordance with manipulation by the user, the display input unit 3 displays: preview images captured by the imaging unit 5 so that the user can check an image of the subject; a captured image; or a variety of menu windows. In addition, the user can input information to the display control apparatus 1 by using the touch panel function of the display input unit 3.

Note that the embodiment of the present disclosure will be described by taking as an example the display control apparatus 1 including the display input unit 3 and the imaging unit 5, but the technical content of the present disclosure is not limited to the embodiment.

For example, the display control apparatus 1 does not have to include the imaging unit 5, and may be configured to communicate with an external imaging apparatus, acquire a preview image and a captured image from the imaging apparatus, and remotely control the imaging apparatus. Also, the display control apparatus 1 does not have to include the display input unit 3, and may be configured to communicate with an external display apparatus, output a generated display image to the display apparatus, and control display of the display apparatus. Further, the display control apparatus 1 does not have to include the display input unit 3 and the imaging unit 5, and may be configured to acquire a captured image from an external imaging apparatus through communication, perform image processing on the image, and output the image to an external display apparatus through communication.

As a mechanism for communication between the display control apparatus 1 and the external imaging apparatus or the display apparatus described above, for example, a wired LAN (Local Area Network), a wireless LAN, infrared-ray communication, or the like may be used, and a variety of mechanisms may be used regardless of wired or wireless manner.

[1.2. Internal Configuration of Display Control Apparatus]

Figure 2:
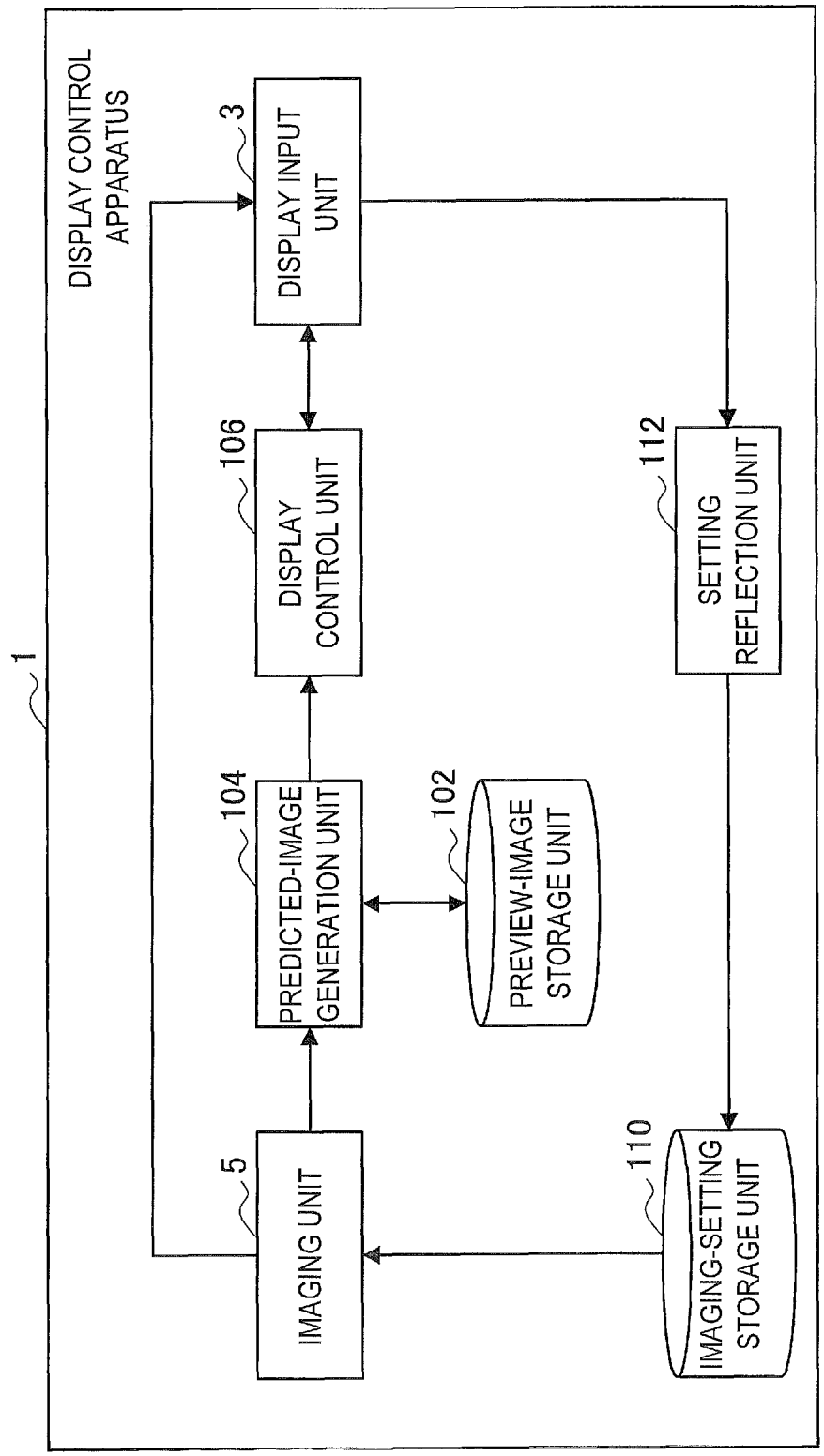
FIG. 2 is a block diagram illustrating an internal configuration of a display control apparatus according to an embodiment of the present disclosure.

Next, an internal configuration of the display control apparatus 1 according to an embodiment of the present disclosure will be described with reference to FIG. 2. FIG. 2 is a block diagram illustrating the internal configuration of the display control apparatus 1 according to the embodiment of the present disclosure. As illustrated in FIG. 2, the display control apparatus 1 includes the imaging unit 5, a preview-image storage unit 102, a predicted-image generation unit 104, a display control unit 106, the display input unit 3, an imaging-setting storage unit 110, and a setting reflection unit 112. Note that the content of the display input unit 3 and the imaging unit 5 which overlaps with the content described with reference to FIG. 1 will be omitted here.

The imaging unit 5 acquires an image being captured as a preview image. Specifically, the imaging unit 5 acquires an image of the subject through the imaging lens, the imaging devices, and the like, and displays the acquired image on the display input unit 3 as the preview image. Here, the imaging unit 5 may update the preview image displayed on the display input unit 3 in predetermined cycles (for example, every 1/60 second).

The preview-image storage unit 102 stores the preview image acquired by the imaging unit 5 in the predetermined cycles. The preview-image storage unit 102 stores the preview image in predetermined cycles appropriate for predicted-image generation to be performed by the predicted-image generation unit 104. Here, the cycles of displaying the preview image on the display input unit 3 may be the same as or different from the cycles of storing the preview image in the preview-image storage unit 102.

When not having enough free space to store the preview image, the preview-image storage unit 102 may secure free space by erasing older preview images in chronological order among stored preview images. Note that the preview-image storage unit 102 may be configured of a volatile memory such as a DRAM (Dynamic Random Access Memory) or may be configured of a non-volatile memory such as a flash memory. Further, the preview-image storage unit 102 may be configured of both the volatile memory and the non-volatile memory, and may be designed to use the non-volatile memory when the volatile memory does not have enough free space.

The predicted-image generation unit 104 generates a predicted image corresponding to an imaging condition from the preview image. Specifically, the predicted-image generation unit 104 reads the preview image stored in the preview-image storage unit 102 and generates the predicted image corresponding to the imaging condition. How the predicted-image generation unit 104 generates a predicted image will be described specifically in and after <2. Modes of Display Control by Display Control Apparatus>. However, the technical content of the present disclosure is not limited to specific examples of the method for generating a predicted image to be described later, and can be implemented by using another method for generating a predicted image.

The display control unit 106 displays the predicted image corresponding to the imaging condition in such a manner as to control a location and a state of the predicted image to be displayed, so that correspondence between the predicted image and the imaging condition can be depicted. Specifically, the display control unit 106 updates the predicted image generated by the predicted-image generation unit 104 in update cycles based on the corresponding imaging condition, and performs effect processing based on the corresponding imaging condition on the predicted image. Note that specific examples of the predicted image controlled by the display control unit 106 will be described in and after <2. Modes of Display Control by Display Control Apparatus>.

Here, the predicted-image generation unit 104 may be configured to generate predicted images based on a plurality of respective imaging conditions, and the display control unit 106 may be configured to display the predicted images on the display input unit 3. Such a case is more preferable, because the user can compare the predicted images generated based on the plurality of imaging conditions with each other to consider an optimum imaging condition.

The display input unit 3 displays the preview image captured by the imaging unit 5. The display input unit 3 also displays each predicted image generated by the predicted-image generation unit 104 in such a manner as to superimpose the predicted image on the preview image, under the control of the display control unit 106. By checking the preview image and the predicted image displayed on the display input unit 3, the user can select an optimum imaging condition and capture an image by using the imaging condition.

The setting reflection unit 112 reflects an imaging condition corresponding to the predicted image selected by the user, on an imaging condition to be used in image capturing. Specifically, when the user selects one of predicted images displayed on the display input unit 3, the setting reflection unit 112 stores the imaging condition corresponding to the predicted image selected by the user in the imaging-setting storage unit 110.

The imaging-setting storage unit 110 stores the imaging condition to be used in the image capturing. For example, the imaging-setting storage unit 110 stores therein imaging conditions to be used in the image capturing, such as a shutter speed, an aperture value, an ISO sensitivity, and a white balance. The imaging unit 5 reads one of the imaging conditions stored in the imaging-setting storage unit 110 to capture an image. Any of imaging conditions stored in the imaging-setting storage unit 110 can be changed by the setting reflection unit 112 to the imaging condition corresponding to a predicted image selected by the user. The imaging-setting storage unit 110 may also store general-purpose imaging conditions in advance.

The configuration of the display control apparatus 1 according to the embodiment of the present disclosure has theretofore been described. The display control apparatus 1 according to the embodiment of the present disclosure generates each predicted image based on the imaging condition, and controls the display of the predicted image so that the correspondence between the predicted image and the imaging condition can be depicted. With such a configuration, the user can intuitively know what imaging condition is used to capture the displayed predicted image and thus can select more appropriate imaging condition to capture the image.

<2. Modes of Display Control by Display Control Apparatus>

Subsequently, a description is given below of modes of display control performed by the display control apparatus 1 according to an embodiment of the present disclosure. Specifically, a first display control example will be described with reference to FIGS. 3 to 6; a second display control example, FIGS. 7 to 17; and a third display control example, FIG. 18.

[2.1. First Display Control Example]

Firstly, the first display control example of the display control apparatus 1 according to the embodiment of the present disclosure will be described with reference to FIGS. 3 to 6. In the first display control example, the predicted-image generation unit 104 generates a predicted image based on a shutter speed which is one of the imaging conditions, and the display control unit 106 updates display of the predicted image in update cycles corresponding to the shutter speed.

With such a configuration, the display control apparatus 1 can depict how imaging results differ from each other depending on the shutter speed, by using not only predicted images but also update cycles of the predicted images. In other words, the display control apparatus 1 can depict shutter speed differences by using update cycle differences, that is, in a mode in which the user can visually recognize the differences easily. Thus, the display control apparatus 1 according to the embodiment of the present disclosure can implement an interface easier to understand by the user.

(2.1.1. Operation in First Display Control Example)

Figure 3:
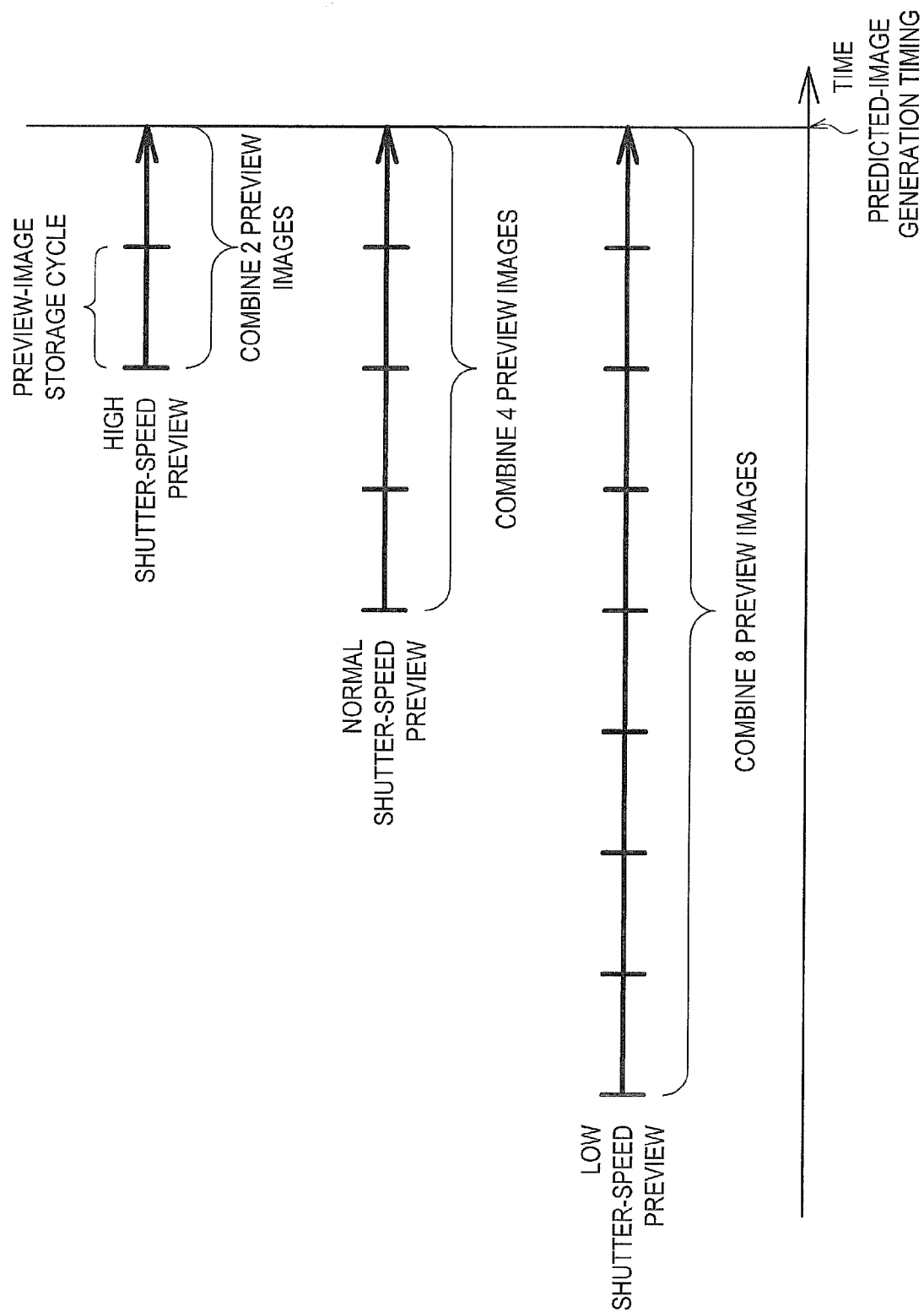
FIG. 3 is an explanatory diagram illustrating a method for generating a predicted image based on shutter speeds.

The description is given below of the first display control example having the aforementioned advantageous effects. Firstly, how the predicted-image generation unit 104 generates predicted images will be described with reference to FIG. 3. FIG. 3 is an explanatory diagram illustrating how the predicted-image generation unit 104 generates predicted images based on shutter speeds.

As illustrated in FIG. 3, each predicted image based on the corresponding shutter speed is acquired by combining a plurality of preview images immediately before predicted-image generation timing located at the right end of a temporal axis. Specifically, the predicted image based on the shutter speed is generated by overlappingly combining a predetermined number of preview images stored in the past in the preview-image storage unit 102, the predetermined number being determined according to the shutter speed. Here, the preview-image storage cycle is set so that a value of the corresponding shutter speed can be an integer multiple of that of the preview-image storage cycle.

For example, a predicted image based on a normal shutter speed (a normal shutter-speed preview) in the middle part of FIG. 3 is generated by overlappingly combining four preview images. A predicted image based on a high shutter speed (a high shutter-speed preview) in the upper part of FIG. 3 is generated by combining two preview images which are less than in the case of generating the normal shutter-speed preview. Further, a predicted image based on a low shutter speed (a low shutter-speed preview) in the lower part is generated by combining eight preview images which are more than in the case of generating the normal shutter-speed preview. Here, a shutter speed ratio of the high shutter speed, the normal shutter speed, and the low shutter speed is 2:4:8 corresponding to the ratio of the numbers of combined preview images.

Here, the normal shutter speed is a shutter speed set as, for example, a current set value in the imaging-setting storage unit 110. Specifically, in the case where the imaging-setting storage unit 110 has a setting to cause the predicted-image generation unit 104 to generate a predicted image and then cause the imaging unit 5 to capture an image at a shutter speed of two seconds, the normal shutter speed is two seconds. In such a case, the user can compare predicted images placed next to each other for cases of image capturing at the shutter speed based on the current set value, the higher shutter speed, and the lower speed. Accordingly, the user more easily knows an effect of changing the shutter speed from the current set value, thus easily selecting a shutter speed optimum for obtaining a desired imaging result.

Meanwhile, when the normal shutter speed set as the current set value is, for example, the highest shutter speed executable by the imaging unit 5, it is not possible for the predicted-image generation unit 104 to generate a high shutter-speed preview based on a higher shutter speed. In such a case, the predicted-image generation unit 104 generates an image indicating "generation infeasibility", instead of the predicted image. The same holds true for a low shutter-speed preview to be generated when the normal shutter speed is the lowest shutter speed executable by the imaging unit 5.

Figure 4:
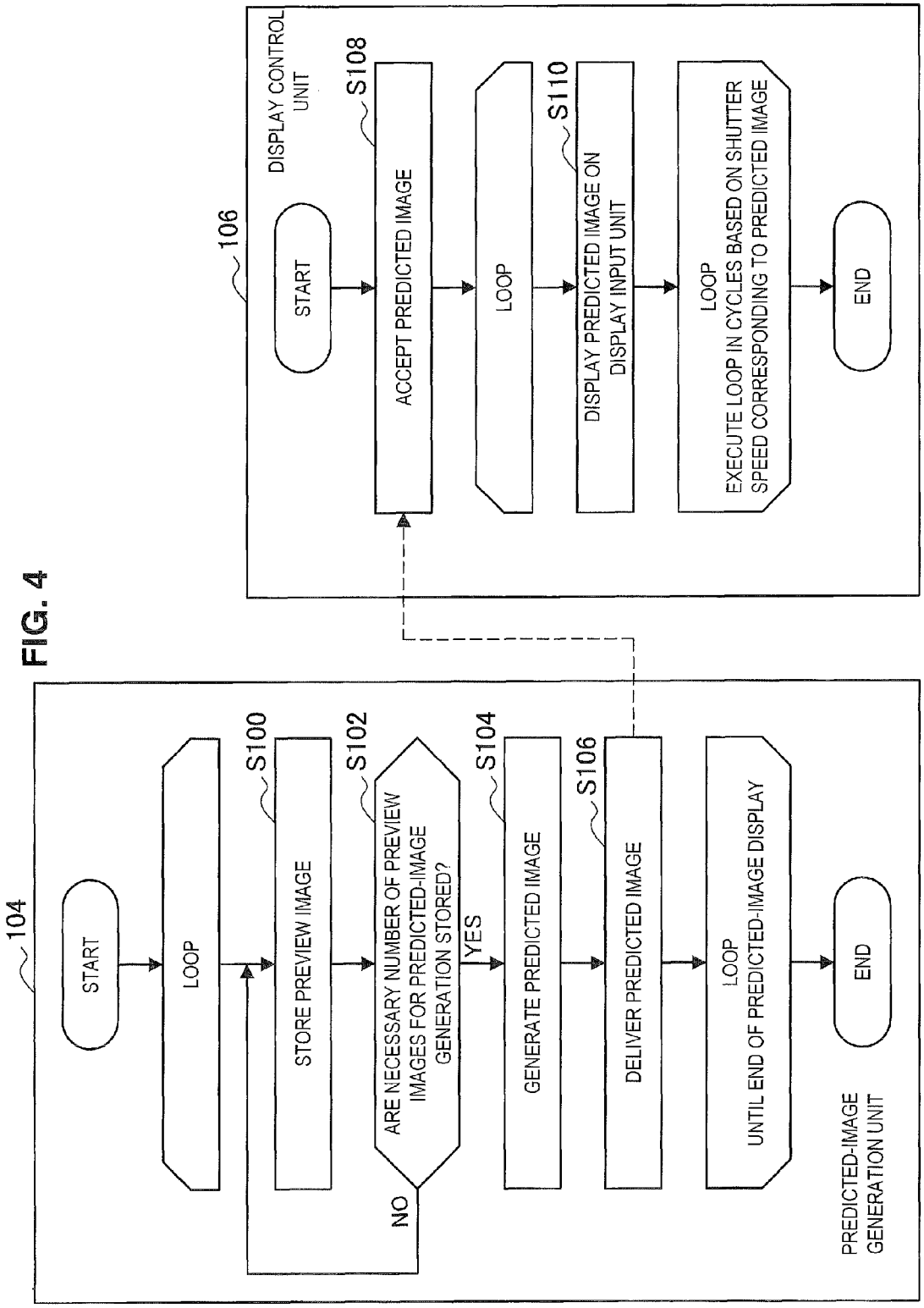
FIG. 4 is a flowchart illustrating an operation in a first display control example.

Next, an operation in the first display control example will be described with reference to FIG. 4. FIG. 4 is a flowchart illustrating an operation in the first display control example. The description is given here of the predicted-image generation and the display control in particular which are characteristic of the first display control example, focusing on operations of the predicted-image generation unit 104 and the display control unit 106.

As illustrated in FIG. 4, the predicted-image generation unit 104 firstly stores a preview image acquired by the imaging unit 5 in the preview-image storage unit 102 (S100). Next, the predicted-image generation unit 104 judges whether a necessary number of preview images for predicted-image generation are stored in the preview-image storage unit 102 (S102). As illustrated in FIG. 3, a plurality of preview images have to be combined to generate a predicted image based on the shutter speed. Thus, if the necessary number of preview images are not stored (No in S102), the processing loops back to S100, and the predicted-image generation unit 104 stores a preview image again. Here, the number of necessary preview images is the number of preview images to be combined for generating the low shutter-speed preview. In the predicted-image generation, the largest number of preview images are necessary for the low shutter-speed preview. For example, in FIG. 3, the number of preview images necessary for the predicted-image generation unit 104 is 8.

If the necessary number of preview images for the predicted-image generation are stored in the preview-image storage unit 102 (Yes in S102), the predicted-image generation unit 104 generates a predicted image by using the preview images (S104). Further, the predicted-image generation unit 104 delivers the generated predicted image to the display control unit 106 (S106) and again loops back to S100 to iterate the predicted-image generation. The predicted-image generation unit 104 executes steps in S100 to S106 described above in a loop until the end of displaying the predicted images.

Meanwhile, the display control unit 106 receiving the delivered predicted image from the predicted-image generation unit 104 in S106 firstly accepts the delivered predicted image (S108). Then, the display control unit 106 displays the accepted predicted image on the display input unit 3 (S110). Here, the display control unit 106 updates display of the predicted image in cycles based on the shutter speed corresponding to the predicted image. In other words, the display control unit 106 executes the step in S110 in a loop for the predicted image in cycles based on the shutter speed used for the predicted image. Here, the predicted image delivery in S106 and S108 may be performed occasionally or in accordance with the update cycle of the display control unit 106.

(2.1.2. Specific Example of Display in First Display Control Example)

Figure 5:
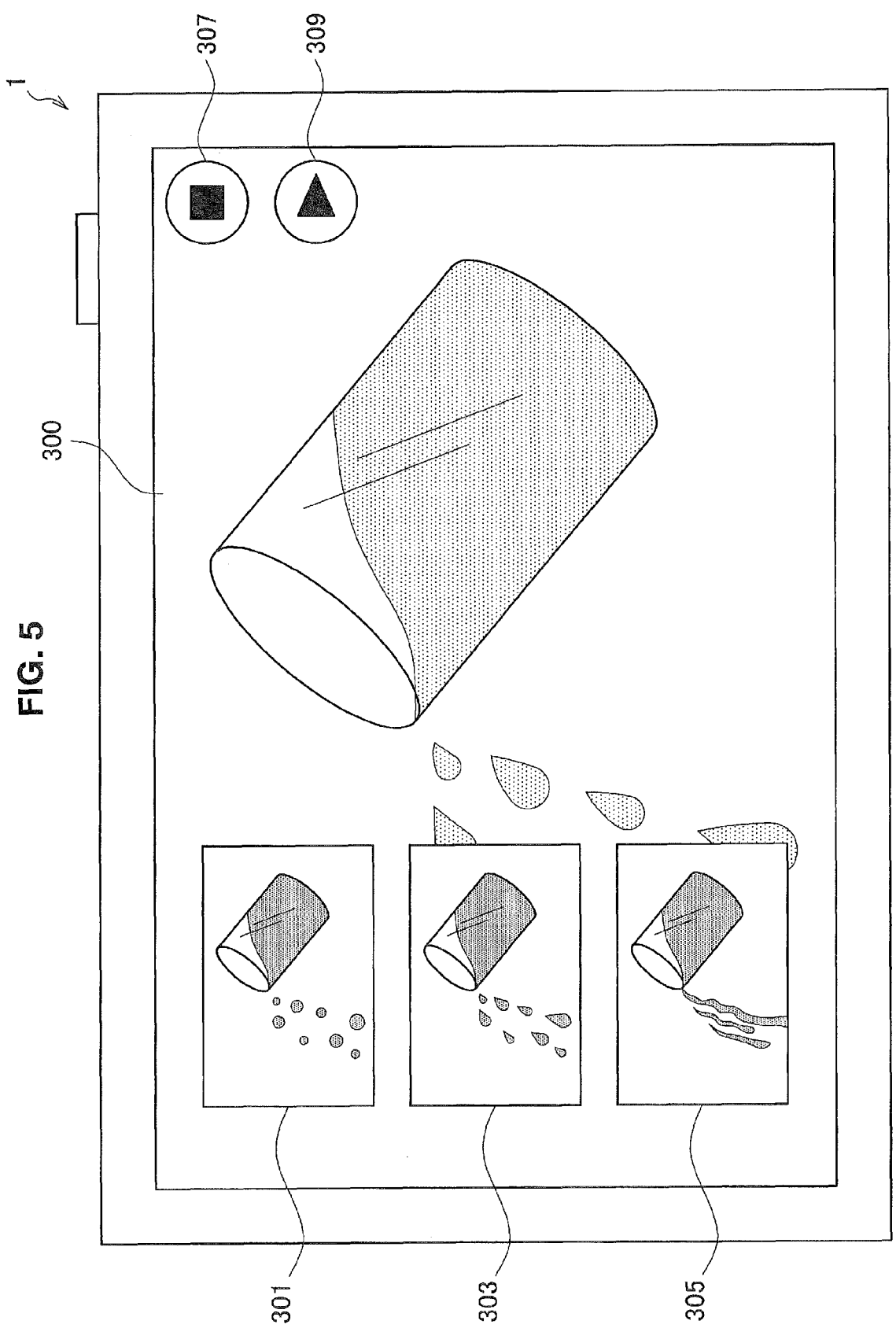
FIG. 5 is an explanatory diagram illustrating a specific example of display in the first display control example.
Figure 6:
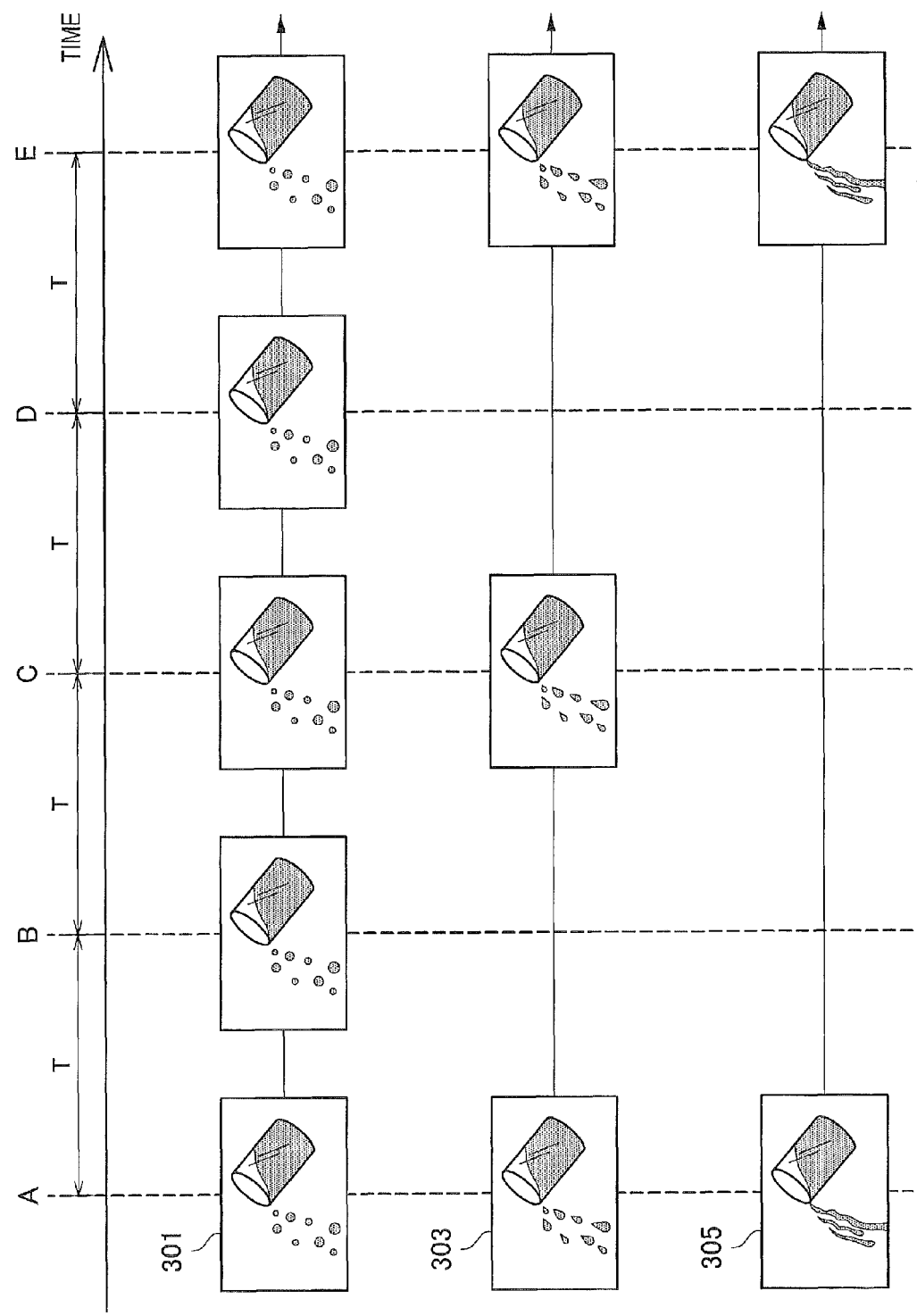
FIG. 6 is an explanatory diagram illustrating cycles of updating predicted images in the first display control example.

Further, a specific example of display in the first display control example will be described below with reference to FIGS. 5 and 6. FIG. 5 is an explanatory diagram illustrating the specific example of the display in the first display control example, and FIG. 6 is an explanatory diagram illustrating update cycles of predicted images in the first display control example.

As illustrated in FIG. 5, a preview image 300, a high shutter-speed preview 301, a normal shutter-speed preview 303, a low shutter-speed preview 305, a preview stop button 307, and a preview restart button 309 are displayed on the display input unit 3 formed on the one surface of the display control apparatus 1.

The preview image 300 is an image being captured by the imaging unit 5. The preview image 300 is acquired by the imaging unit 5 and displayed on the display input unit 3. The preview image 300 is updated in predetermined cycles independently from the high shutter-speed preview 301, the normal shutter-speed preview 303, and the low shutter-speed preview 305. The high shutter-speed preview 301, the normal shutter-speed preview 303, and the low shutter-speed preview 305 are displayed in such a manner as to be superimposed on the preview image 300.

As illustrated in FIG. 5, the normal shutter-speed preview 303 is a predicted image captured at the normal shutter speed, showing waterdrops distorted into a teardrop shape due to the shutter speed between the high speed and the low speed. The high shutter-speed preview 301 is a predicted image captured at the high shutter speed, showing circular waterdrops as if the waterdrops stopped instantly, due to the high shutter speed. The low shutter-speed preview 305 is a predicted image captured at the low shutter speed, showing waterdrops not separated but continuous due to the low shutter speed.

Here, the user selects a desired one of the predicted images to be captured. This makes it possible to reflect the corresponding shutter speed on the imaging setting and thus to capture an image close to the selected predicted image.

When the user selects the preview stop button 307, the display control unit 106 stops the update of the high shutter-speed preview 301, the normal shutter-speed preview 303, and the low shutter-speed preview 305. For example, suppose a case where the predicted images are updated in short cycles and where it is difficult for the user to check the predicted images. In this case, the user can cause the display control unit 106 to stop the update of the predicted images by selecting the preview stop button 307, thus facilitating the checking of the predicted images.

When the user selects the preview restart button 309, the display control unit 106 restarts the stopped update of the high shutter-speed preview 301, the normal shutter-speed preview 303, and the low shutter-speed preview 305. For example, in the case where an image of another subject is to be captured and where the user wishes to newly check predicted images, the user can cause the display control unit 106 to restart stopped update of predicted images, by selecting the preview restart button 309.

In the description above, the display control unit 106 stops the update of the predicted images when the preview stop button 307 is selected, and restarts the update of the predicted images when the preview restart button 309 is selected, but the technical content of the present disclosure is not limited to the exemplification. For example, the display control unit 106 may erase the predicted images from the display input unit 3 when the preview stop button 307 is selected, and may again display the erased predicted images on the display input unit 3 when the preview restart button 309 is selected. Such a configuration enables the user to erase the predicted images superimposed on the preview image 300 and thus to check also a part hidden by any predicted image superimposed on the preview image 300.

Subsequently, the update cycles of the high shutter-speed preview 301, the normal shutter-speed preview 303, and the low shutter-speed preview 305 will be described with reference to FIG. 6.

In FIG. 6, the horizontal axis represents a temporal axis, and predicted images based on the respective shutter speeds are disposed at timing of updating the predicted images. Here, intervals between "A" and "B", "B" and "C", "C" and "D", and "D" and "E" on the temporal axis are each represented by "T". As illustrated in FIG. 6, the high shutter-speed preview 301 is updated at time points "A", "B", "C", "D", and "E" in update cycles of "T". The normal shutter-speed preview 303 is updated at time points of "A", "C", and "E" in update cycles of "2T". The low shutter-speed preview 305 is updated at time points of "A" and "E" in update cycles of "4T". In other words, as the shutter speed becomes higher, the display control unit 106 updates the predicted images in shorter update cycles. The ratio of the update cycles of the predicted images takes on values corresponding to those of the ratio of the shutter speeds. Here, "T" may be set to any period of time. For example, a period of time of "T" is two seconds, four seconds, six second, or the like.

As described above, the display control apparatus 1 implementing the first display control example can depict how imaging results differ from each other depending on the shutter speed, by using the update cycles of the predicted images. In addition, the display control apparatus 1 can display the predicted images based on the respective different shutter speeds in such a manner as to place the predicted images next to each other on the same screen, and thus can display the predicted images so that the user can compare camera shake amounts and imaging result changes at the shutter speeds. Further, when the predicted images thus displayed include a predicted image representing a shutter speed enabling the user to obtain a desirable imaging result, the user selects the predicted image to thereby be able to reflect the corresponding shutter speed on the imaging unit 5.

[2.2. Second Display Control Example]

Next, a second display control example of the display control apparatus 1 according to the embodiment of the present disclosure will be described with reference to FIGS. 7 to 17. In the second display control example, the predicted-image generation unit 104 generates predicted images based on the imaging conditions, and the display control unit 106 performs effect processing corresponding to the imaging condition on each predicted image. Here, examples of the imaging conditions can include the shutter speed, the aperture value, the ISO sensitivity, and the white balance.

With such a configuration, the effect processing based on the imaging condition corresponding to the predicted image enables the display control apparatus 1 to depict, in an emphasized manner, how imaging results differ from each other depending on the imaging condition. The display control apparatus 1 can also depict an effect which are easy to recognize visually and understand in such a manner that the effect corresponds to the imaging condition, thus enabling even a user who is not technically minded to easily and intuitively know the imaging condition.

(2.2.1. Operation in Second Display Control Example)

A description is given below of the second display control example having the aforementioned advantageous effects. Firstly, how the predicted-image generation unit 104 generates predicted images based on the imaging conditions will be described with reference to FIGS. 7 to 9 for respective imaging conditions. However, the description of a method for generating a predicted image based on a shutter speed holds true for the description given with reference to FIG. 3, and thus is omitted here.

Firstly, a method for generating a predicted image based on an aperture value will be described with reference to FIG. 7. FIG. 7 is an explanatory diagram illustrating how the predicted-image generation unit 104 generates a predicted image based on an aperture value.

As illustrated in FIG. 7, predicted images based on aperture values are generated in the following manner. The preview image 300 is acquired in the setting of the highest aperture value. The lower the aperture value of the setting is, the larger a blur amount of blurring processing performed on the preview image 300 is. Specifically, the predicted-image generation unit 104 firstly acquires distance information of the preview image 300 by using a sensor or the like to judge an area serving as background (or foreground). Here, if the distance information of the preview image 300 is unknown, the predicted-image generation unit 104 judges an area except an area around the focus point which has been focused as the background (or foreground). In FIG. 7, the predicted-image generation unit 104 judges flowers located in front as the focus point. Next, the predicted-image generation unit 104 performs blur processing on an area having distance information different from that of the focus point and the background (or foreground) area, the blur processing being performed in a blur amount based on the aperture value and the distance information.

Here, the blur amount based on the aperture value and the distance information is preferably calculated and stored in advance in the display control apparatus 1. In addition to the blur processing, the predicted-image generation unit 104 may emphasize the darkness and brightness of the corresponding predicted image to further enhance the degree of reproducibility of the predicted image. Note that an image used by the predicted-image generation unit 104 in the predicted-image generation is not limited to the preview image 300, and may be an image acquired by combining a plurality of the preview images 300.

In FIG. 7, a normal aperture-value preview 323 is set at a normal aperture value, and thus the preview image 300 undergoes the blur processing in a blur amount in accordance with the setting, except the flowers located at the focus point. A high aperture-value preview 321 is set at a high aperture value, and thus the preview image 300 undergoes the blur processing in a smaller blur amount. The high aperture-value preview 321 shows a clearer image than the normal aperture-value preview 323. A low aperture-value preview 325 is set at a low aperture value, and thus the preview image 300 undergoes the blur processing in a larger blur amount, except the flowers located at the focus point. The low aperture-value preview 325 shows a blurrier image than the normal aperture-value preview 323.

Here, the normal aperture value is, for example, an aperture value set as a current set value in the imaging-setting storage unit 110. When the aforementioned predicted images are displayed on the display input unit 3, the user can compare the predicted images captured based on the aperture values of the current set value, the higher aperture value, and the lower aperture value.

Meanwhile, when the normal aperture value set as the current set value is, for example, the highest aperture value executable by the imaging unit 5, it is not possible for the predicted-image generation unit 104 to generate the high aperture-value preview 321 having a higher aperture value. In such a case, the predicted-image generation unit 104 generates an image indicating "generation infeasibility", instead of the predicted image. The same holds true for the low aperture-value preview 325 to be generated when the normal aperture value is the lowest aperture value executable by the imaging unit 5.

Next, a method for generating a predicted image based on an ISO sensitivity will be described with reference to FIG. 8. FIG. 8 is an explanatory diagram illustrating how the predicted-image generation unit 104 generates a predicted image based on an ISO sensitivity.

As illustrated in FIG. 8, predicted images based on ISO sensitivities are generated in the following manner. The preview image 300 is a high resolution image acquired in the setting of the lowest ISO sensitivity. The higher the ISO sensitivity of the setting is, the rougher the preview image 300 undergoing an image roughening filter is. The image roughening filter is preferably stored in advance in the display control apparatus 1 for each ISO sensitivity. In addition, instead of the image roughening filter, the predicted-image generation unit 104 may also use image processing algorithm for lowering the resolutions of the preview image 300 to generate a predicted image. Further, in addition to the use of the image roughening filter, the predicted-image generation unit 104 may emphasize the darkness and brightness of the predicted image to further enhance the degree of reproducibility of the predicted image. Note that an image used by the predicted-image generation unit 104 in the predicted-image generation is not limited to the preview image 300, and may be an image acquired by combining a plurality of the preview images 300.

In FIG. 8, a normal ISO-sensitivity preview 333 is set at a normal ISO sensitivity, and thus shows a predicted image acquired by applying, to the preview image 300, image roughening in accordance with the setting. A low ISO-sensitivity preview 331 is set at a low ISO sensitivity, and thus has a low degree of image roughening, being an image having higher resolutions than the normal ISO-sensitivity preview 333. A high ISO-sensitivity preview 335 is set at a high ISO sensitivity, and thus has a high degree of image roughening, being a rougher image than the normal ISO-sensitivity preview 333.

Here, the normal ISO sensitivity is, for example, an ISO sensitivity set as a current set value in the imaging-setting storage unit 110. When the aforementioned predicted images are displayed on the display input unit 3, the user can compare the predicted images captured based on the ISO sensitivity of the current set value, the lower ISO sensitivity, and the higher ISO sensitivity.

Meanwhile, when the normal ISO sensitivity set as the current set value is, for example, the lowest ISO sensitivity executable by the imaging unit 5, it is not possible for the predicted-image generation unit 104 to generate the low ISO-sensitivity preview 331 having a lower ISO sensitivity. In such a case, the predicted-image generation unit 104 generates an image indicating "generation infeasibility", instead of the predicted image. The same holds true for the high ISO-sensitivity preview 335 to be generated when the normal ISO sensitivity is the highest ISO sensitivity executable by the imaging unit 5.

Figure 9:
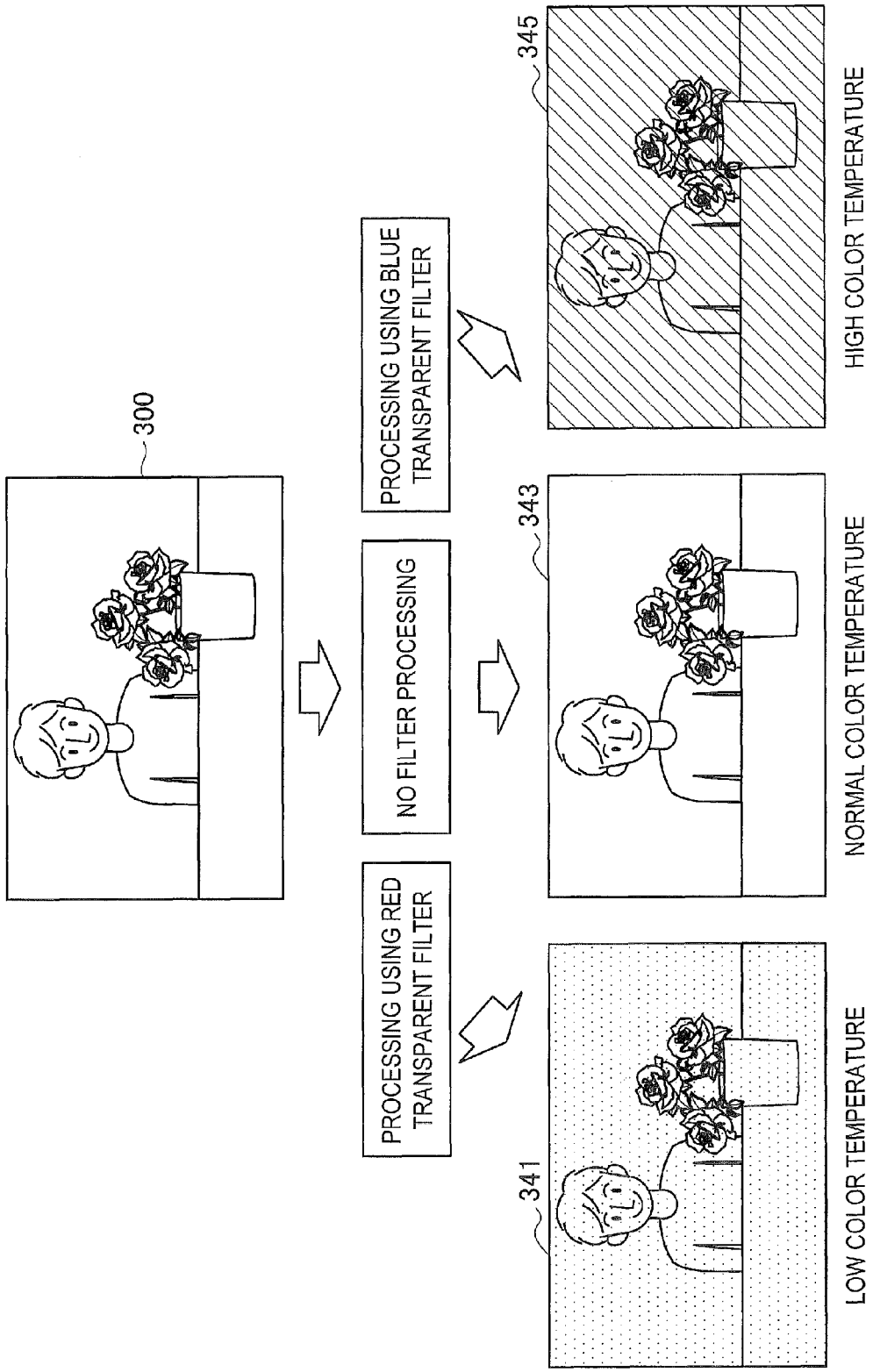
FIG. 9 is an explanatory diagram illustrating a method for generating a predicted image based on a white balance.

Further, a method for generating a predicted image based on a white balance will be described with reference to FIG. 9. FIG. 9 is an explanatory diagram illustrating how the predicted-image generation unit 104 generates a predicted image based on a white balance.

As illustrated in FIG. 9, predicted images based on white balances are each generated by performing color-transparent filter processing in which a hue is changed based on a white balance (color temperature), on the assumption that the preview image 300 is an image having an optimum white balance. The color transparent filter configured to change the hue is preferably stored in advance in the display control apparatus 1 for each white balance (color temperature). In addition, instead of the color transparent filter, the predicted-image generation unit 104 may also use image processing algorithm for changing the hue of the preview image 300 to generate a predicted image. Note that an image used by the predicted-image generation unit 104 in the predicted-image generation is not limited to the preview image 300, and may be an image acquired by combining a plurality of the preview images 300.

In FIG. 9, a normal color-temperature preview 343 has a normal white balance, and thus uses the preview image 300 as a predicted image. A low color-temperature preview 341 has a white balance of a low color temperature, and thus is generated by being processed using a red transparent filter of applying a red hue to the preview image 300 (expressed in a dot-hatched manner in FIG. 9). A high color-temperature preview 345 has a white balance of a high color temperature, and thus is generated by being processed using a blue transparent filter of applying a blue hue to the preview image 300 (expressed in a hatched manner in FIG. 9).

Here, the normal white balance is, for example, a white balance set as a current set value in the imaging-setting storage unit 110. When the aforementioned predicted images are displayed on the display input unit 3, the user can compare the predicted images captured based on the white balances of the current set value, the lower color temperature, and the higher color temperature.

Meanwhile, when the normal white balance set as the current set value is, for example, the lowest white balance executable by the imaging unit 5, it is not possible for the predicted-image generation unit 104 to generate the low color-temperature preview 341 having a lower color temperature. In such a case, the predicted-image generation unit 104 generates an image indicating "generation infeasibility", instead of the predicted image. The same holds true for the high color-temperature preview 345 to be generated when the normal white balance is the white balance of the highest color temperature executable by the imaging unit 5.

Figure 10:
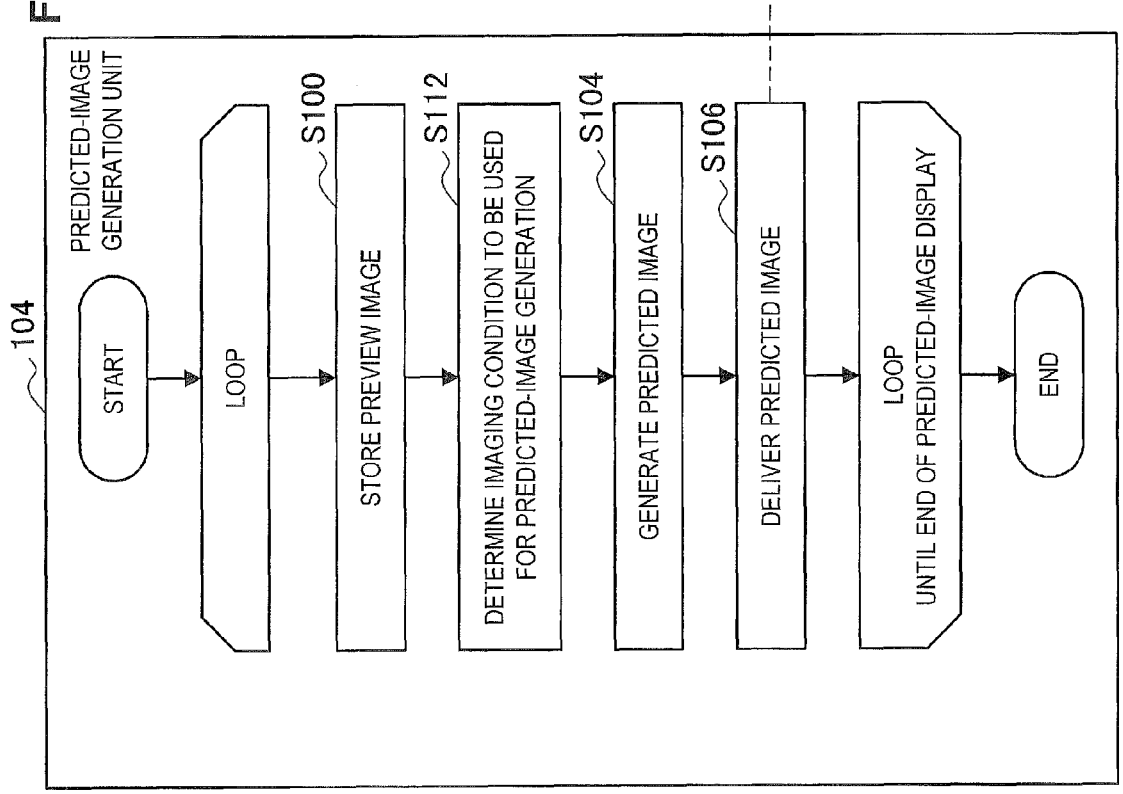
FIG. 10 is a flowchart illustrating an operation in a second display control example.

Next, an operation in the second display control example will be described with reference to FIG. 10. FIG. 10 is a flowchart illustrating the operation in the second display control example. Like the first display control example, the description is given here focusing on operations of the predicted-image generation unit 104 and the display control unit 106.

As illustrated in FIG. 10, the predicted-image generation unit 104 firstly stores a preview image acquired by the imaging unit 5 in the preview-image storage unit 102 (S100). Next, the predicted-image generation unit 104 determines an imaging condition for generating a predicted image (S112). Examples of the imaging condition used for the predicted-image generation include the shutter speed, the aperture value, the ISO sensitivity, and the white balance as described above. Further, the predicted-image generation unit 104 generates a predicted image by using the preview image (S104). Next, the predicted-image generation unit 104 delivers the generated predicted image to the display control unit 106 (S106) and again loops back to S100 to iterate the predicted-image generation. The predicted-image generation unit 104 executes steps in S100, S112, S104, and S106 described above in a loop until the end of displaying the predicted images.

Meanwhile, the display control unit 106 receiving the delivered predicted image from the predicted-image generation unit 104 in S106 firstly accepts the delivered predicted image (S108). Then, the display control unit 106 performs effect processing corresponding to the imaging condition on the accepted predicted image (S114), and displays the predicted image having undergone the effect processing on the display input unit 3 (S110). Here, the display control unit 106 executes steps in S114 and S110 in predetermined update cycles in a loop until the end of displaying the predicted images. Here, the predicted image delivery in S106 and S108 may be performed occasionally or in accordance with the update cycle of the display control unit 106.

Although FIG. 10 illustrates the case of generating each predicted image by using only one preview image, the technical content of the present disclosure is not limited to such a configuration. For example, in the case of generating the predicted image by using a plurality of preview images, S100 and S102 are performed instead of S100 described above, the plurality of preview images are stored, and thereafter steps in S112 and after are executed.

(2.2.2. Specific Examples of Display in Second Display Control Example)

Figure 11:
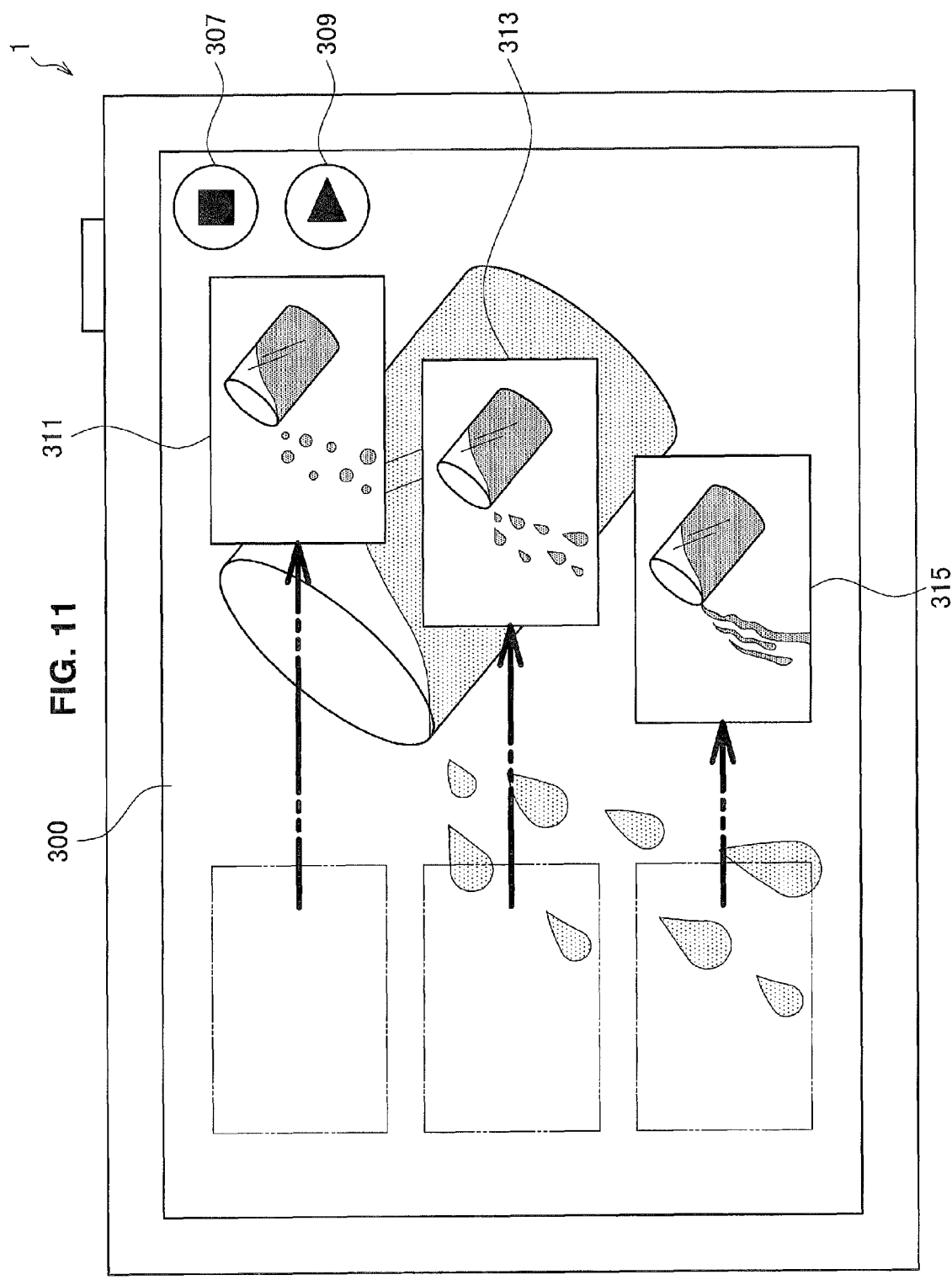
FIG. 11 is an explanatory diagram illustrating a specific example of display of effect processing performed on each predicted image generated based on a shutter speed in the second display control example.

Subsequently, specific examples of display in the second display control example will be described with reference to FIGS. 11 to 17. Firstly, specific examples of display in the case of using the shutter speed as the imaging condition will be described with reference to FIGS. 11 to 14. FIG. 11 is an explanatory diagram illustrating one of the specific examples of display in the case of using the shutter speed as the imaging condition in the second display control example.

As illustrated in FIG. 11, the preview image 300, a high shutter-speed preview 311, a normal shutter-speed preview 313, a low shutter-speed preview 315, the preview stop button 307, and the preview restart button 309 are displayed on the display input unit 3 formed on the one surface of the display control apparatus 1. Note that configurations and methods for generating the high shutter-speed preview 311, the normal shutter-speed preview 313, and the low shutter-speed preview 315 are the same as those in the description given with reference to FIG. 3, and a description thereof is omitted here. The preview image 300 is also the same as in the first display control example, and a detailed description thereof is omitted here.

In the second display control example, the high shutter-speed preview 311, the normal shutter-speed preview 313, and the low shutter-speed preview 315 are displayed while undergoing effect processing of moving the previews from the left end of the preview image 300 to the right end. Here, each predicted image moves at a speed corresponding to the shutter speed of the predicted image, and an arrow located on the left of the predicted image in FIG. 11 represents a moving amount of the predicted image within a predetermined time period. In other words, in FIG. 11, the high shutter-speed preview 311 undergoes the effect processing of moving at the highest speed, and the normal shutter-speed preview 313 and the low shutter-speed preview 315 have lower moving speeds in this order. Thus, by performing the effect processing of moving the predicted images, the display control apparatus 1 can depict the shutter speeds which are the imaging conditions in such a manner that the shutter speeds correspond to the moving speeds of the respective predicted images.

Note that the effect of each predicted image may be an effect in which the predicted image is moved only once from the left end of the preview image 300 to the right end. Moreover, the effect of the predicted image may be an effect in which the predicted image is moved from the left end of the preview image 300 to the right end, and then is moved again from the left end of the preview image 300 to the right end. Further, the effect of the predicted image may be an effect in which the predicted image is shuttled in the preview image 300, that is, is moved from the left end of the preview image 300 to the right end, and then is moved from the right end of the preview image 300 to the left end. Note that the moving direction of each predicted image in the effect applied to the predicted image is not limited to a horizontal direction with predicted image facing the preview image 300, and may be any of a wide variety of directions, such as a vertical direction or an oblique direction.

Further, the cycles of the effects applied to the respective predicted images by the display control unit 106 may differ from each other. Moreover, the display control unit 106 may temporarily stop each predicted image at a predetermined position (for example, at the left end) of the preview image 300 to match the cycle start timing of each effect. Further, the display control unit 106 may apply the effect processing to each predicted image one by one in order.

When the user selects the preview stop button 307, the display control unit 106 stops the effect processing of predicted images. For example, when it is difficult for the user to check the predicted images due to the effect processing applied to the predicted images, the user can cause the display control unit 106 to stop the effect processing, by selecting the preview stop button 307, thus facilitating the checking of the predicted images. When the user selects the preview restart button 309, the display control unit 106 restarts the stopped effect processing of the predicted images.

Figure 12:
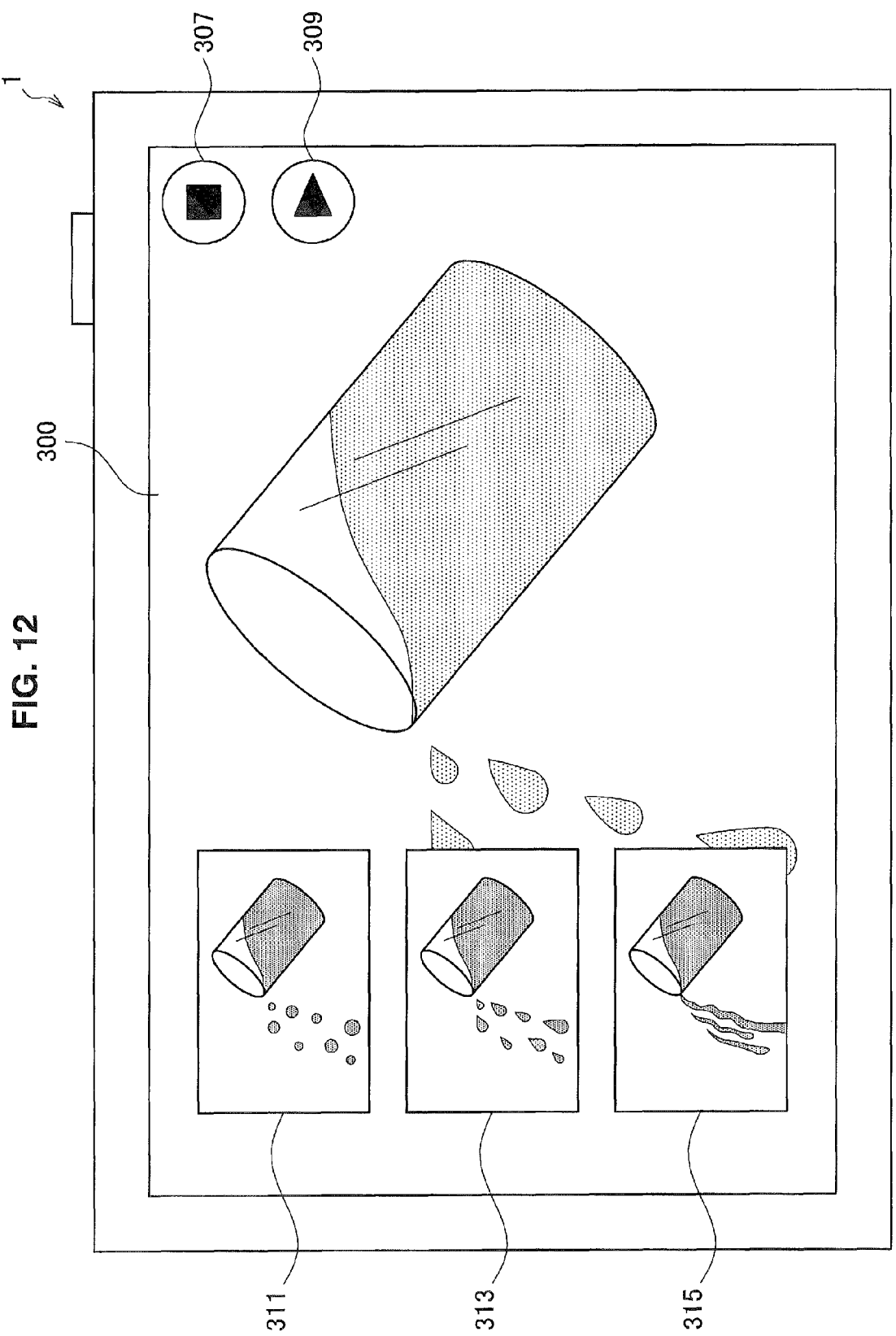
FIG. 12 is an explanatory diagram illustrating a specific example of display in the case where a preview stop button is pressed in FIG. 11.

FIG. 12 is an explanatory diagram illustrating a specific example of how the display control apparatus 1 displays images when the user selects the preview stop button 307 in FIG. 11. In FIG. 12, the predicted images of the high shutter-speed preview 311, the normal shutter-speed preview 313, and the low shutter-speed preview 315 are aligned with each other at the left end of the preview image 300, and the effect processing moving on the preview image 300 is stopped. Here, the position at which the display control unit 106 stops the predicted images is not limited to the left end of the preview image 300. The display control unit 106 may stop the predicted images at a position where the predicted images have been displayed when the preview stop button 307 is selected.

In the description above, the display control unit 106 stops the effect processing of each predicted image when the preview stop button 307 is selected, and restarts the effect processing when the preview restart button 309 is selected. However, the technical content of the present disclosure is not limited to the exemplification. For example, the display control unit 106 may erase each predicted image from the display input unit 3 when the preview stop button 307 is selected, and displays again the erased predicted image on the display input unit 3 when the preview restart button 309 is selected. Such a configuration enables the user to erase the predicted images superimposed on the preview image 300 and thus to check also a part hidden by any predicted image superimposed on the preview image 300.

Figure 13:
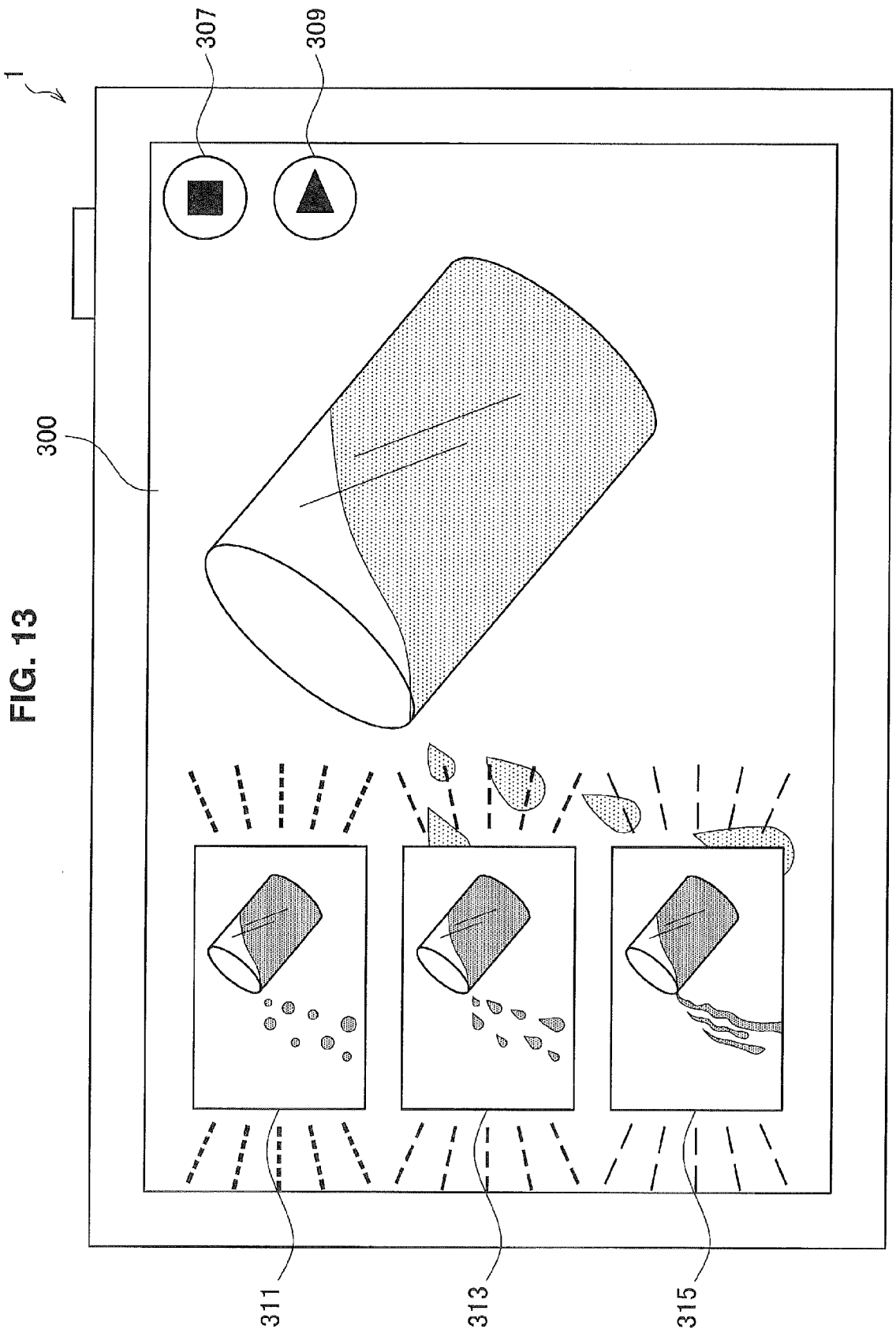
FIG. 13 is an explanatory diagram illustrating a first modification of the effect processing in FIG. 11.

Next, modifications of the effect processing in the case of using the shutter speed as the imaging condition in the second display control example will be described with reference to FIGS. 13 and 14. FIG. 13 is an explanatory diagram illustrating a first modification of the effect processing, and FIG. 14 is an explanatory diagram illustrating a second modification of the effect processing.

As illustrated in FIG. 13, instead of the effect of moving the predicted images described with reference to FIG. 11, the display control unit 106 performs an effect of blinking the predicted images in the first modification of the effect processing. As illustrated in FIG. 13, the high shutter-speed preview 311, the normal shutter-speed preview 313, and the low shutter-speed preview 315 are displayed on the preview image 300 as in FIG. 11, and each predicted image undergoes the blinking effect processing. Here, the predicted image blinks at intervals corresponding to the shutter speed of the predicted image. A predicted image set at a higher shutter speed blinks at shorter intervals.

In other words, the display control unit 106 applies the effect processing of the shortest-interval blinking to the high shutter-speed preview 311, and the normal shutter-speed preview 313 and the low shutter-speed preview 315 undergo the effect processing having longer blinking intervals in this order. Thus, by performing the effect processing of blinking the predicted images, the display control apparatus 1 can depict the shutter speed of each predicted image in such a manner that the shutter speed corresponds to the blinking intervals of the predicted image. Note that the display control unit 106 may apply such effect processing that blinks all the predicted images at the same time, or such effect processing that blinks each predicted image one by one in order.

Figure 14:
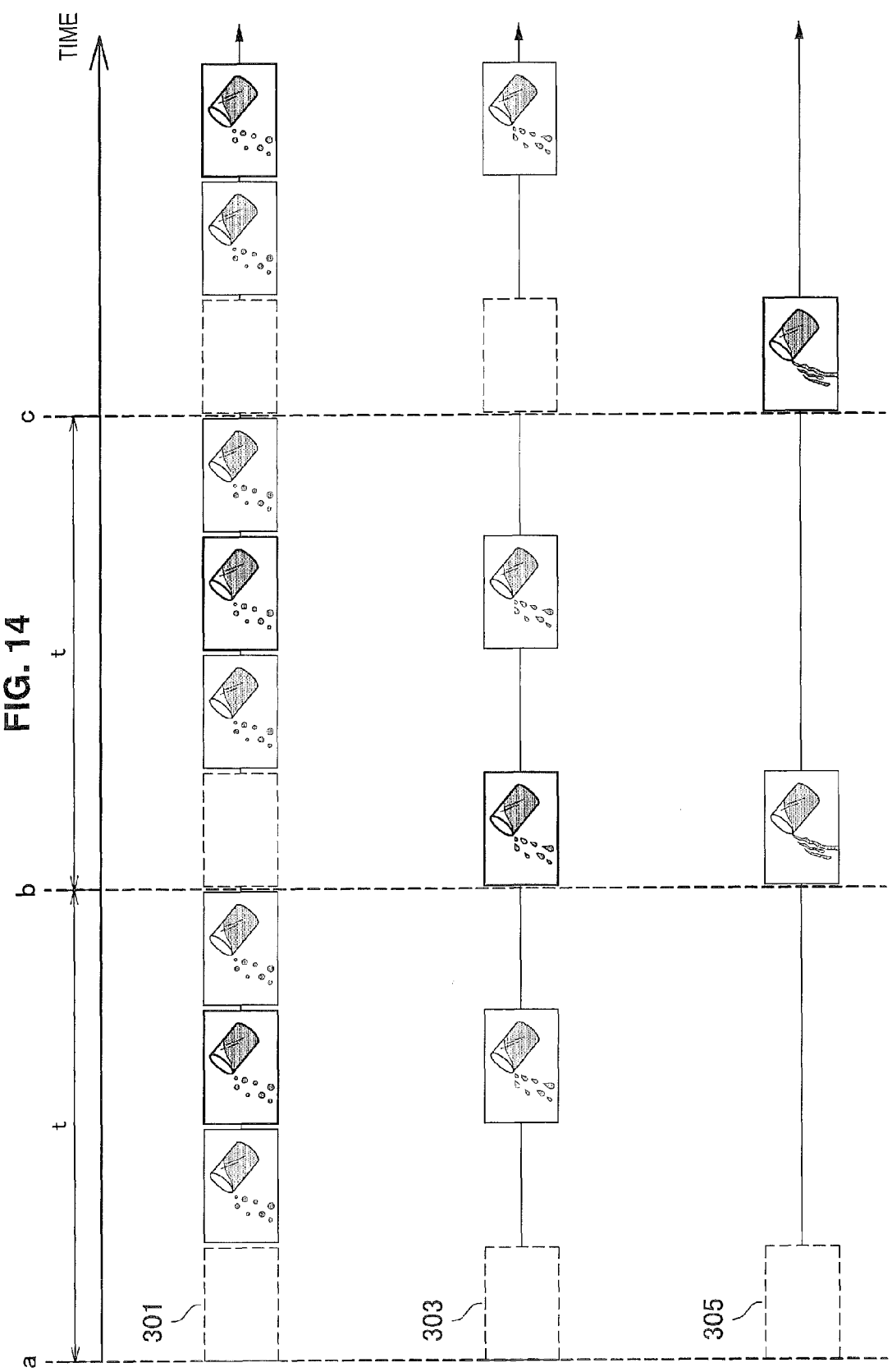
FIG. 14 is an explanatory diagram illustrating a second modification in the effect processing in FIG. 11.

Next, as illustrated in FIG. 14, instead of the effect processing of moving each predicted image described with reference to FIG. 11, effect processing of fading in and out the predicted image is performed in the second modification of the effect processing. In FIG. 14, the horizontal axis represents a temporal axis, and fade-in and fade-out of the predicted image are expressed by using the degree of the darkness of the predicted image, so that fade-in and -out cycles are expressed. As illustrated in FIG. 14, periods of time between "a" and "b" and "b" and "c" are each represented by "t". Specifically, the high shutter-speed preview 311 fades in and out between "a" and "b", and thus has a fade-in and -out cycle of "t". The normal shutter-speed preview 313 fades in and out between "a" and "c", and thus has a fade-in and -out cycle of "2t". The low shutter-speed preview 315 fades in between "a" and "c", and thus has a fade-in and -out cycle of "4t".

In other words, the length of the fade-in and -out cycle of each predicted image corresponds to the shutter speed of the predicted image. The higher the shutter speed of the predicted image is, the shorter the fade-in and -out cycle is. The high shutter-speed preview 311 undergoes the effect processing of the shortest cycle fade-in and -out, and the normal shutter-speed preview 313 and the low shutter-speed preview 315 have longer fade-in and -out cycles in this order. Thus, by performing the effect processing of fading in and out each predicted image, the display control apparatus 1 can depict the shutter speed of the predicted image in such a manner that the shutter speed corresponds to the fade-in and -out cycles of the predicted image.

Also in the modifications of the effect processing described with reference to FIGS. 13 and 14, when the user selects the preview stop button 307 or the preview restart button 309, the display control unit 106 stops or restarts the effect processing as a matter of course, like the effect processing described with reference to FIG. 11. When the preview stop button 307 or the preview restart button 309 is selected, the display control unit 106 may also erase or redisplay the predicted images, instead of the stopping and restarting the effect processing.

Figure 15:
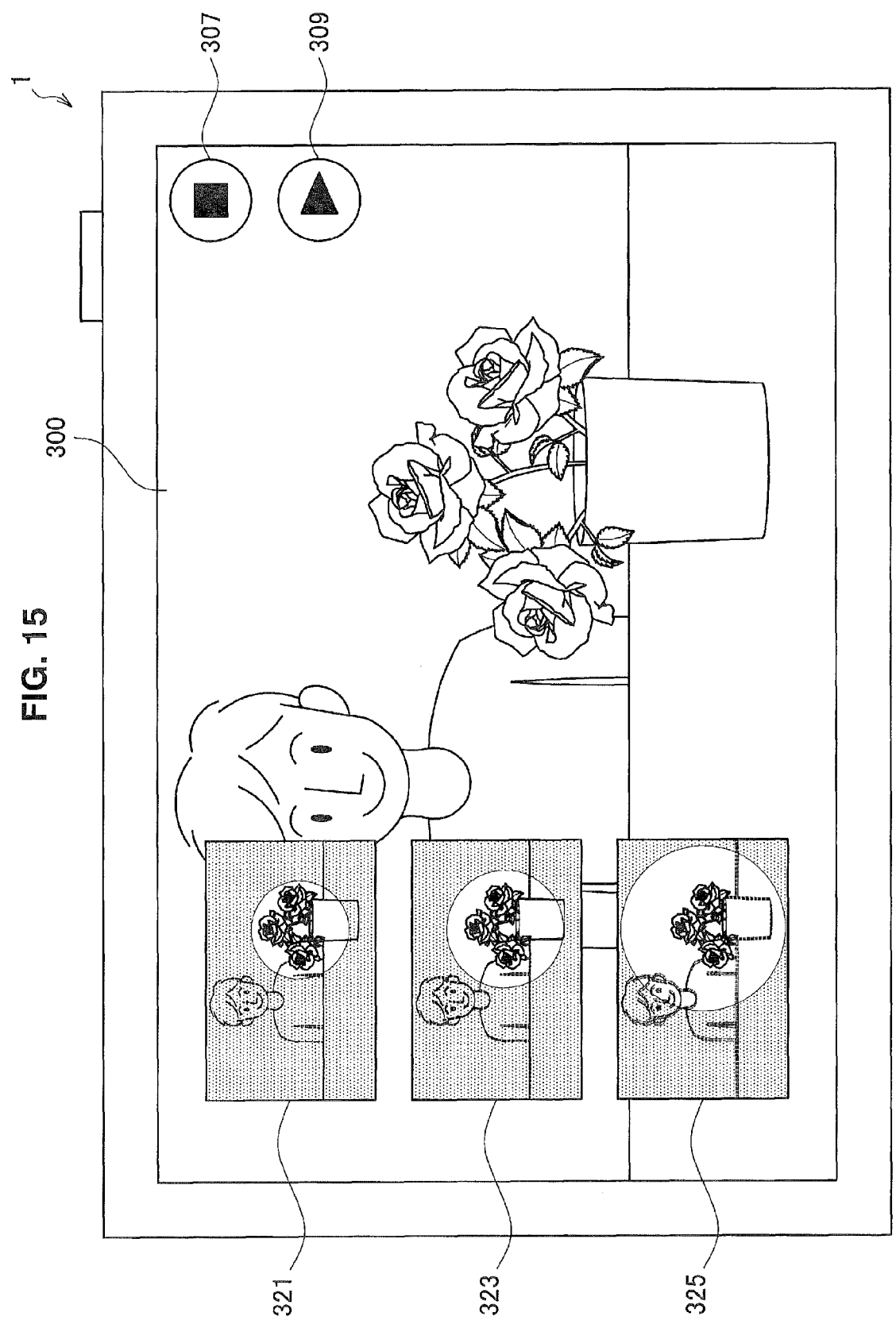
FIG. 15 is an explanatory diagram illustrating a specific example of display of effect processing performed on each predicted image generated based on an aperture value in the second display control example.

Next, a specific example of display in the case of using an aperture value as the imaging condition will be described with reference to FIG. 15. FIG. 15 is an explanatory diagram illustrating the specific example of display in the case of using an aperture value as the imaging condition in the second display control example.

As illustrated in FIG. 15, the preview image 300, the high aperture-value preview 321, the normal aperture-value preview 323, the low aperture-value preview 325, the preview stop button 307, and the preview restart button 309 are displayed on the display input unit 3 formed on the one surface of the display control apparatus 1. Note that the preview image 300, the preview stop button 307, and the preview restart button 309 have substantially the same configurations as those described with reference to FIG. 11, and thus a detailed description thereof is omitted here.

The high aperture-value preview 321 shows a predicted image in the case of capturing an image by using the high aperture value; the normal aperture-value preview 323, the normal aperture value; and the low aperture-value preview 325, the low aperture value. Here, each predicted image is generated by the display control unit 106 by using the generation method described with reference to FIG. 7.

In the specific example of the display illustrated in FIG. 15, the display control unit 106 applies, to each predicted image, effect processing of darkening the outside of a periphery of a circle surrounding flowers located at the focus point. Here, the darkening range of the predicted image has a size corresponding to the aperture value of the predicted image. In other words, in FIG. 15, the high aperture-value preview 321 undergoes the effect processing having the largest darkening range, and the normal aperture-value preview 323 and the low aperture-value preview 325 have smaller darkening ranges in this order.

Thus, by performing the effect processing of darkening the outside of the periphery of each predicted image, the display control apparatus 1 can depict the aperture value of each predicted image in such a manner that the aperture value corresponds to the darkening range of the predicted image.

Here, in the specific example illustrated in FIG. 15, the display control unit 106 darkens the outside of the periphery of the circle surrounding flowers located at the focus point in each predicted image, but the technical content of the present disclosure is not limited to the exemplification. For example, the display control unit 106 may darken, in each predicted image, the outside of a periphery of a circle surrounding the center of the predicted image. However, when the focus point exists in a periphery of the predicted image, darkening an area other than the circle surrounding the center of the predicted image darkens the focus point, and thus might deteriorate viewability of the predicted image. Accordingly, it is preferable to darken the outside of the periphery of the circle surrounding the focus point, because viewability of the predicted image can be maintained preferably.

Figure 16:
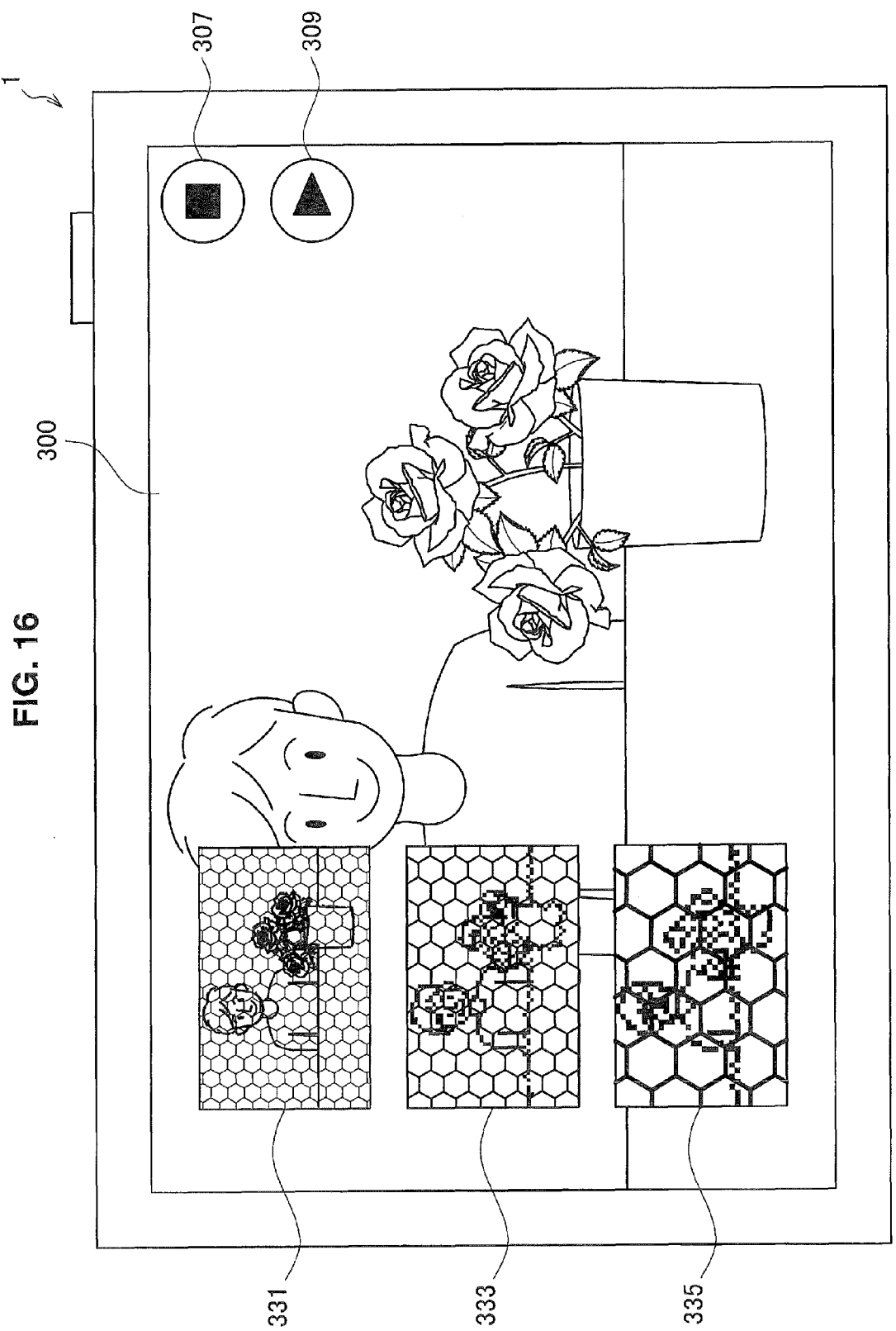
FIG. 16 is an explanatory diagram illustrating a specific example of display of effect processing performed on each predicted image generated based on an ISO sensitivity in the second display control example.

Subsequently, a specific example of display in the case of using an ISO sensitivity as the imaging condition will be described with reference to FIG. 16. FIG. 16 is an explanatory diagram illustrating the specific example of display in the case of using an ISO sensitivity as the imaging condition in the second display control example.

As illustrated in FIG. 16, the preview image 300, the low ISO-sensitivity preview 331, the normal ISO-sensitivity preview 333, the high ISO-sensitivity preview 335, the preview stop button 307, and the preview restart button 309 are displayed on the display input unit 3 formed on the one surface of the display control apparatus 1. Note that the preview image 300, the preview stop button 307, and the preview restart button 309 have substantially the same configurations as those described with reference to FIG. 11, and thus a detailed description thereof is omitted here.

The low ISO-sensitivity preview 331 shows a predicted image captured with the low ISO sensitivity; the normal ISO-sensitivity preview 333, the normal ISO sensitivity; and the high ISO-sensitivity preview 335, the high ISO sensitivity. Here, each predicted image is generated by the display control unit 106 by using the generation method described with reference to FIG. 8.

In the specific example of the display illustrated in FIG. 16, the display control unit 106 performs effect processing of superimposing a hexagonal frame image on each predicted image. Here, the size of frames and the thickness of frame lines in each frame image superimposed on the predicted image correspond to the ISO sensitivity of the predicted image. In other words, in FIG. 16, a 7×7 frame image is superimposed on the low ISO-sensitivity preview 331; a 5×5 frame image, the normal ISO-sensitivity preview 333; and a 3×3 frame image, the high ISO-sensitivity preview 335. Also, the low ISO-sensitivity preview 331, the normal ISO-sensitivity preview 333, and the high ISO-sensitivity preview 335 have thicker frame lines in this order.

Thus, by performing the effect processing of superimposing the frame image on each predicted image, the display control apparatus 1 can depict the ISO sensitivity in such a manner that the ISO sensitivity of the predicted image corresponds to the size of the frames and the thickness of the frame lines of the hexagonal frame image superimposed on the predicted image.

Here, in the specific example of the display illustrated in FIG. 16, the display control unit 106 performs the effect processing of changing both the size of the frames and the thickness of the frame lines of each frame image superimposed on the corresponding predicted image, in accordance with the ISO sensitivity. However, the technical content of the present disclosure is not limited to the exemplification. In each frame image superimposed on the corresponding predicted image, only the size of the frames or only the thickness of the frame lines may be changed in accordance with the ISO sensitivity.

Figure 17:
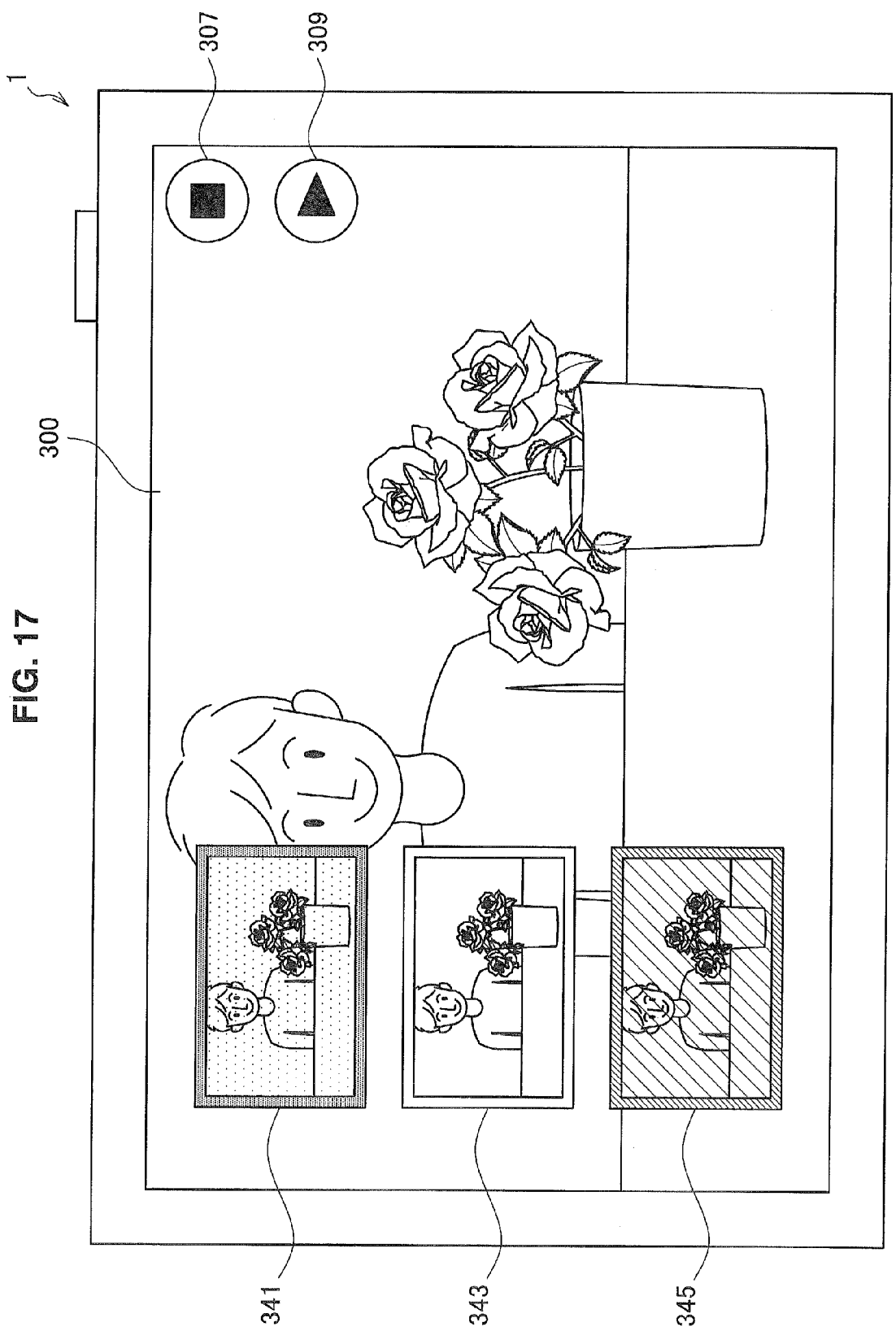
FIG. 17 is an explanatory diagram illustrating a specific example of display of effect processing performed on each predicted image generated based on a white balance in the second display control example.

Further, a specific example of display in the case of using a white balance as the imaging condition will be described with reference to FIG. 17. FIG. 17 is an explanatory diagram illustrating the specific example of display in the case of using a white balance as the imaging condition in the second display control example.

As illustrated in FIG. 17, the preview image 300, the low color-temperature preview 341, the normal color-temperature preview 343, the high color-temperature preview 345, the preview stop button 307, and the preview restart button 309 are displayed on the display input unit 3 formed on the one surface of the display control apparatus 1. Note that the preview image 300, the preview stop button 307, and the preview restart button 309 have substantially the same configurations as those described with reference to FIG. 11, and thus a detailed description thereof is omitted here.

The low color-temperature preview 341 shows a predicted image captured at the low color-temperature setting; the normal color-temperature preview 343, the normal color-temperature setting; and the high color-temperature preview 345, the high color-temperature setting. Here, each predicted image is generated by the generation method described with reference to FIG. 9.

In the specific example of the display illustrated in FIG. 17, the display control unit 106 performs effect processing of superimposing a framed image on each predicted image. Here, the framed image superimposed on the predicted image has a color corresponding to the white balance (hatching in FIG. 17). Specifically, a framed image in a color of a color transparent filter used in predicted-image generation is superimposed on the predicted image. In other words, in FIG. 17, a red framed image is superimposed on the low color-temperature preview 341; a white framed image, the normal color-temperature preview 343; and a blue framed image, the high color-temperature preview 345.

Thus, by performing the effect processing of superimposing, on each predicted image, a framed image in a color corresponding to the white balance of the predicted image, the display control apparatus 1 can depict the hue of the predicted image in such a manner that the hue corresponds to the color of the framed image.

As described above, the display control apparatus 1 implementing the second display control example can depict how imaging results differ from each other depending on the imaging condition in an emphasized manner, by using the effect processing performed on the predicted images. Thus, the display control apparatus 1 can depict the imaging condition by using an effect easy to understand for the user, thus enabling even a user who is not technically minded to easily and intuitively know the imaging condition. Further, when the predicted images thus displayed include a predicted image representing an imaging condition enabling the user to obtain a desirable imaging result, the user selects the predicted image to thereby be able to reflect the corresponding imaging condition on the imaging unit 5.

[2.3. Third Display Control Example]

Subsequently, a third display control example of the display control apparatus 1 according to the embodiment of the present disclosure will be described with reference to FIG. 18. In the third display control example, the predicted-image generation unit 104 generates predicted images based on the shutter speeds. The display control unit 106 also performs effect processing corresponding to the shutter speed on each predicted image and updates the predicted image in update cycles corresponding to the shutter speed. In other words, in the third display control example, the display control apparatus 1 performs display control in the first display control example and the second display control example which are combined together.

With such a configuration, the display control apparatus 1 can depict how imaging results differ from each other depending on the shutter speed, by using each predicted image, an effect based on the shutter speed, and update cycles of the predicted image. In addition, the cycles of the effect processing applied to the predicted image are made to correspond to the update cycles of the predicted image, and thereby the display control apparatus 1 can provide the user with easy-to-see display of the predicted image having undergone the effect processing.

(2.3.1. Operation in Third Display Control Example)

The third display control example having the aforementioned advantageous effects will be described with reference to FIG. 18. Note that a method for generating a predicted image based on a shutter speed is the same as in the description given with reference to FIG. 3, and thus a detailed description is omitted here. FIG. 18 is a flowchart illustrating an operation in the third display control example. The description is given below as in the first and second display control examples, focusing on the operations of the predicted-image generation unit 104 and the display control unit 106.

As illustrated in FIG. 18, the predicted-image generation unit 104 firstly stores a preview image acquired by the imaging unit 5 in the preview-image storage unit 102 (S100). Next, the predicted-image generation unit 104 judges whether a necessary number of preview images for predicted-image generation are stored in the preview-image storage unit 102 (S102). If the necessary number of preview images are not stored (No in S102), the processing loops back to S100, and the predicted-image generation unit 104 stores a preview image again.

If the necessary number of preview images for the predicted-image generation are stored in the preview-image storage unit 102 (Yes in S102), the predicted-image generation unit 104 generates a predicted image by using the preview images (S104). Next, the predicted-image generation unit 104 delivers the generated predicted image to the display control unit 106 (S106), and again loops back to S100 to iterate the predicted-image generation. The predicted-image generation unit 104 executes steps in S100 to S106 described above in a loop until the end of displaying the predicted images.

Meanwhile, the display control unit 106 receiving the delivered predicted image from the predicted-image generation unit 104 in S106 as illustrated in FIG. 10 firstly accepts the delivered predicted image (S108). Then, the display control unit 106 performs the effect processing corresponding to the shutter speed on the accepted predicted image (S114), and displays the predicted image having undergone the effect processing on the display input unit 3 (S110). Here, the display control unit 106 updates display of the predicted image in cycles based on the shutter speed corresponding to the predicted image. In other words, the display control unit 106 executes the step in S110 in a loop for the predicted image in cycles based on the shutter speed used for the predicted image. Here, the predicted image delivery in S106 and S108 may be performed occasionally or in accordance with the update cycle of the display control unit 106.

Examples of the specific example of the display in the third display control example described above include the following case. The effect processing is performed in which each predicted image executes a loop of movement from the left end of the preview image 300 to the right end at a moving speed corresponding to the shutter speed described with reference to FIG. 11. When the predicted image reaches the right end, the predicted image is updated.

In such a case, the cycle of the effect processing applied to the predicted image matches the update cycle of the predicted image. Thus, the display control apparatus 1 can provide the user with easier-to-see display of the predicted image having undergone the effect processing. Further, when the predicted images thus displayed include a predicted image representing a shutter speed enabling the user to obtain a desirable imaging result, the user selects the predicted image to thereby be able to reflect the corresponding shutter speed on the imaging unit 5.

<3. Hardware Configuration of Display Control Apparatus>

The embodiment of the present disclosure has been described above in detail. Information processing by the aforementioned display control apparatus 1 is implemented by software and hardware of the display control apparatus 1 in cooperation with each other, the hardware being described below with reference to FIG. 19.

Figure 19:
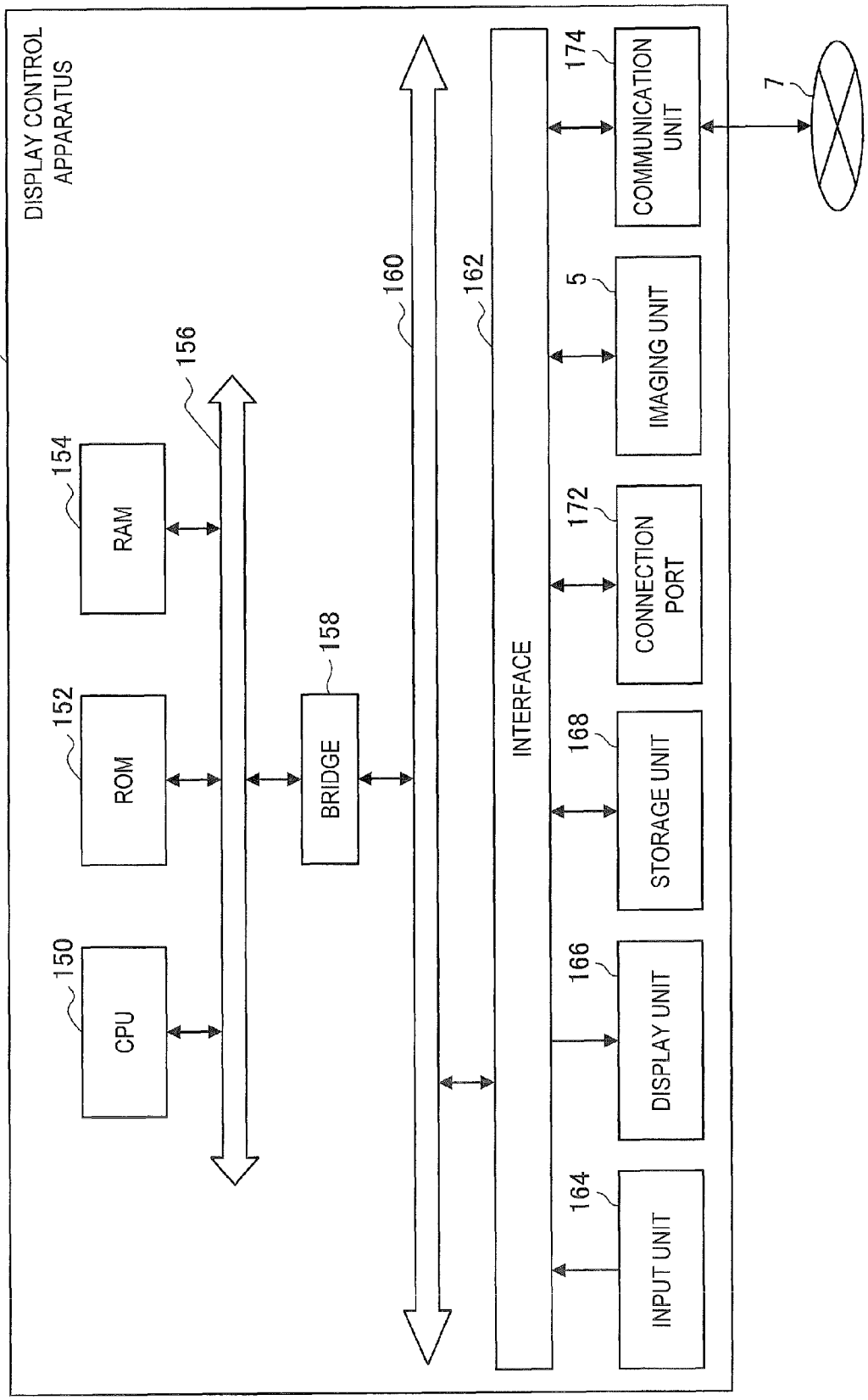
FIG. 19 is an explanatory diagram illustrating a hardware configuration of the display control apparatus according to an embodiment of the present disclosure.

FIG. 19 is an explanatory diagram illustrating a hardware configuration of the display control apparatus 1. As illustrated in FIG. 19, the display control apparatus 1 includes a CPU (Central Processing Unit) 150, a ROM (Read Only Memory) 152, a RAM (Random Access Memory) 154, an input unit 164, a display unit 166, a storage unit 168, the imaging unit 5, a connection port 172, and a communication unit 174.

The CPU 150 functions as an arithmetic processing unit and a controller device, and controls overall operation of the display control apparatus 1 according to a variety of programs. The CPU 150 may also be a microprocessor, and may include a circuit configured to separately perform computation dedicated to image processing. Further, the circuit configured to perform computation dedicated to image processing may be included in the imaging unit 5.

The ROM 152 stores therein programs and operational parameters which are used by the CPU 150. The RAM 154 temporarily stores therein the programs used and executed by the CPU 150, parameters appropriately varying in executing the programs, and the like. Note that preview images and predicted images are preferably stored in the RAM 154, but storage space of the storage unit 168 may be used when the RAM 154 does not have enough storage space.

The CPU 150, the ROM 152, and the RAM 154 are connected to each other via a bridge 158, internal buses 156 and 160, and the like. The CPU 150, the ROM 152, and the RAM 154 are also connected to the input unit 164, the display unit 166, the storage unit 168, the imaging unit 5, the connection port 172, and the communication unit 174, and the like, via an interface 162.

The input unit 164 includes: an input mechanism used by the user for imputing information, such as a touch panel, a button, a switch, a handle, a dial, a microphone, and the like; an input control circuit configured to generate an input signal based on user input and to output the signal to the CPU 150; and the like. By manipulating the input unit 164, a user of the display control apparatus 1 can instruct the display control apparatus 1 for various data input and processing operation.

The display unit 166 is, for example, an LCD device, an OLED device, or a lamp, displaying to the user captured preview images, generated predicted images, menu screens, and the like. Here, the display input unit 3 described with reference to FIGS. 1 and 2 is a touch panel apparatus, and also functions as the display unit 166 and the input unit 164.

The storage unit 168 is a device for data storage exemplified as a storage unit of the display control apparatus 1. The storage unit 168 may include a storage medium, a storage device configured to store data in a storage medium, a reader configured to read data from a storage medium, and a deletion device configured to delete stored data. The storage unit 168 stores programs to be executed by the CPU 150 and a variety of data such as images captured by the imaging unit 5.

The imaging unit 5 includes imaging devices such as CMOS image sensors or CCD image sensors, and an imaging lens. The imaging unit 5 receives light made incident from a subject through the imaging lens, photoelectrically converts the light in each imaging device, converts the light into an image signal, and acquires an image of the subject.

The connection port 172 is, for example, a connection interface configured of a connection port, such as a USB (Universal Serial Bus) port or an optical audio terminal, for connecting an externally connected device.

The communication unit 174 is, for example, a communication interface configured of a communication device or the like for connecting to a network 7. The communication unit 174 may also be a communication device supporting a wireless LAN or a cabled communication device configured to perform wired cable communication.

Note that the network 7 is a wired or wireless transmission channel for information transmitted from devices connected to the network 7. For example, the network 7 may include: public networks such as the Internet, a telephone network, and a satellite communication network; a LAN; a WAN (Wide Area Network); and the like.

It is also possible to generate a computer program for causing the hardware such as the CPU, the ROM, and the RAM which are built in the display control apparatus 1 to exert functions equivalent to those in the components of the display control apparatus 1. There is also provided a storage medium storing the computer program.

It should be understood by those skilled in the art that various modifications, combinations, sub-combinations and alterations may occur depending on design requirements and other factors insofar as they are within the scope of the appended claims or the equivalents thereof Additionally, the present technology may also be configured as below:

(1) A display control apparatus including:
a predicted-image generation unit configured to generate a predicted image of an imaging result based on a shutter speed; and
a display control unit configured to update display of the predicted image in an update cycle corresponding to the shutter speed.

(2) The display control apparatus according to (1),
wherein based on a plurality of the shutter speeds, the predicted-image generation unit generates a plurality of the predicted images corresponding to the respective shutter speeds.

(3) The display control apparatus according to (2),
wherein the display control unit displays the predicted images corresponding to the respective shutter speeds in a manner that the predicted images are placed next to each other on a screen.

(4) The display control apparatus according to (2) or (3), further including:
a setting reflection unit configured to, when a user selects one of the predicted images, reflect one of the shutter speeds corresponding to the selected predicted image on an imaging condition to be used for imaging.

(5) The display control apparatus according to any one of (1) to (4),
wherein the display control unit superimposes the predicted image on a preview image being captured.

(6) The display control apparatus according to any one of (1) to (5),
wherein the display control unit stops update of the predicted image or restarts the update of the predicted image the update of which has been stopped, when a user performs manipulation.

(7) The display control apparatus according to any one of (1) to (6),
wherein the display control unit performs effect processing corresponding to the shutter speed on the predicted image, and
wherein the effect processing has a cycle corresponding to the update cycle.

(8) A display control apparatus including:
a predicted-image generation unit configured to generate a predicted image of an imaging result based on an imaging condition; and
a display control unit configured to perform effect processing on the predicted image in accordance with the imaging condition.

(9) The display control apparatus according to (8),
wherein based on a plurality of the imaging conditions, the predicted-image generation unit generates a plurality of the predicted images corresponding to the respective imaging conditions.

(10) The display control apparatus according to (9),
wherein the display control unit displays the predicted images corresponding to the respective imaging conditions in a manner that the predicted images are placed next to each other on a screen.

(11) The display control apparatus according to (9) or (10), further including:
a setting reflection unit configured to, when a user selects one of the predicted images, reflect one of the imaging conditions corresponding to the selected predicted image on an imaging condition to be used for imaging.

(12) The display control apparatus according to any one of (8) to (11),
wherein the display control unit superimposes the predicted image on a preview image being captured.

(13) The display control apparatus according to any one of (8) to (12),
wherein the display control unit stops the effect processing or restarts the stopped effect processing, when a user performs manipulation.

(14) The display control apparatus according to any one of (8) to (13), wherein the imaging condition is a condition including a shutter speed.

(15) The display control apparatus according to (14), wherein the display control unit performs effect processing of moving the predicted image at a higher speed on the predicted image generated based on a higher shutter speed.

(16) The display control apparatus according to (14), wherein the display control unit performs effect processing of blinking the predicted image at shorter intervals on the predicted image generated based on a higher shutter speed.

(17) The display control apparatus according to any one of (8) to (13),
wherein the imaging condition is a condition including at least one of an aperture value, an ISO sensitivity, and a white balance.

(18) A display control method including:
generating a predicted image of an imaging result based on a shutter speed; and
updating display of the predicted image in an update cycle corresponding to the shutter speed.

(19) A display control method including:
generating a predicted image of an imaging result based on an imaging condition; and
performing effect processing on the predicted image in accordance with the imaging condition.

What is claimed is:

1. A display control apparatus, comprising:
a memory unit configured to store preview images; and
a microprocessor configured to:
combine a determined number of the preview images to generate a predicted image, wherein the determined number of the preview images to be combined is determined based on a shutter speed of the display control apparatus;
fade in and fade out the predicted image displayed on a display screen in a fade in and fade out cycle, wherein a length of the fade in and fade out cycle decreases with an increase in the shutter speed, and wherein the fade in and fade out of the predicted image is expressed based on a degree of darkness of the predicted image.

2. The display control apparatus according to claim 1, wherein a plurality of predicted images that corresponds to a plurality of shutter speeds are generated based on the respective shutter speeds.

3. The display control apparatus according to claim 2, wherein the plurality of predicted images that corresponds to the respective shutter speeds are displayed in a manner that the plurality of predicted images are placed next to each other on the display screen.

4. The display control apparatus according to claim 3, wherein the microprocessor is configured to:
in an event a user selects one of the plurality of predicted images, reflect a shutter speed that corresponds to the selected one of the plurality of predicted images on an image capture condition to be used to capture image.

5. The display control apparatus according to claim 1, wherein the microprocessor is further configured to superimpose the predicted image on a captured image.

6. The display control apparatus according to claim 5, wherein the microprocessor is further configured to stop update of the predicted image or restart the update of the predicted image for which the update was stopped, in an event a user input is detected.

7. A display control apparatus, comprising:
a microprocessor configured to:
generate a predicted image of a captured image based on an image capture condition of the display control apparatus;
process the predicted image to superimpose a hexagonal frame image on the predicted image; and
change a thickness of a frame line of the hexagonal frame image in accordance with an ISO sensitivity of the display control apparatus; and
a memory unit configured to store the predicted image.

8. The display control apparatus according to claim 7, wherein a plurality of predicted images that corresponds to a plurality of ISO sensitivities are generated based on the respective ISO sensitivities.

9. The display control apparatus according to claim 8, wherein the plurality of predicted images that corresponds to the respective ISO sensitivities are displayed in a manner that the plurality of predicted images are placed next to each other on a screen.

10. The display control apparatus according to claim 9, wherein the microprocessor is configured to:
in an event a user selects one of the plurality of predicted images, reflect an ISO sensitivity that corresponds to the selected one of the plurality of predicted images on the image capture condition to be used to capture an image.

11. The display control apparatus according to claim 7, wherein the microprocessor is further configured to superimpose the predicted image on the captured image.

12. The display control apparatus according to claim 11, wherein the microprocessor is further configured to stop an effect process applied on the predicted image or restart the stopped effect process, in an event a user input is detected.

13. The display control apparatus according to claim 7, wherein the predicted image of the captured image is based on the ISO sensitivity.

14. The display control apparatus according to claim 7, wherein the predicted image of the captured image is further based on a white balance.

15. A display control method, comprising:
combining a determined number of preview images to generate a predicted image, wherein the determined number of the preview images to be combined is determined based on a shutter speed of the display control apparatus;
fading in and fading out the predicted image displayed on a display screen in a fade in and fade out cycle, wherein a length of the fading in and fading out cycle decreases with an increase in the shutter speed, and wherein the fading in and fading out of the predicted image is expressed based on a degree of darkness of the predicted image.

16. A display control method, comprising:
generating a predicted image of a captured image based on an image capture condition of the display control apparatus;
processing the predicted image to superimpose a hexagonal frame image on the predicted image; and
changing a thickness of a frame line of hexagonal frame image in accordance with an ISO sensitivity of the display control apparatus.

* * * * *